June 30, 1931.   J. T. MOLTRUP   1,812,359
METHOD AND MEANS FOR THE PRODUCTION OF DRAWN METAL RODS
Filed April 6, 1928   17 Sheets-Sheet 1
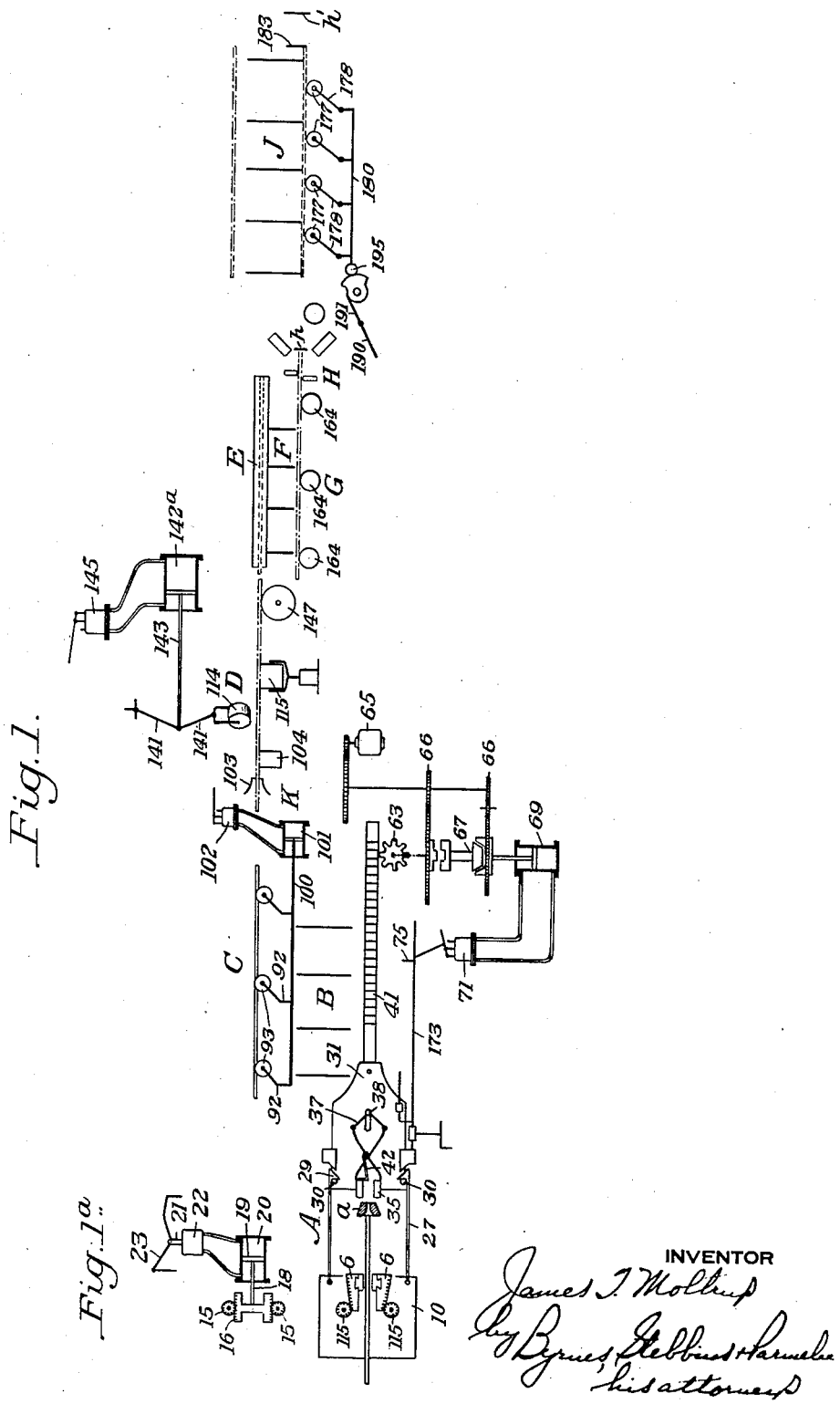
INVENTOR

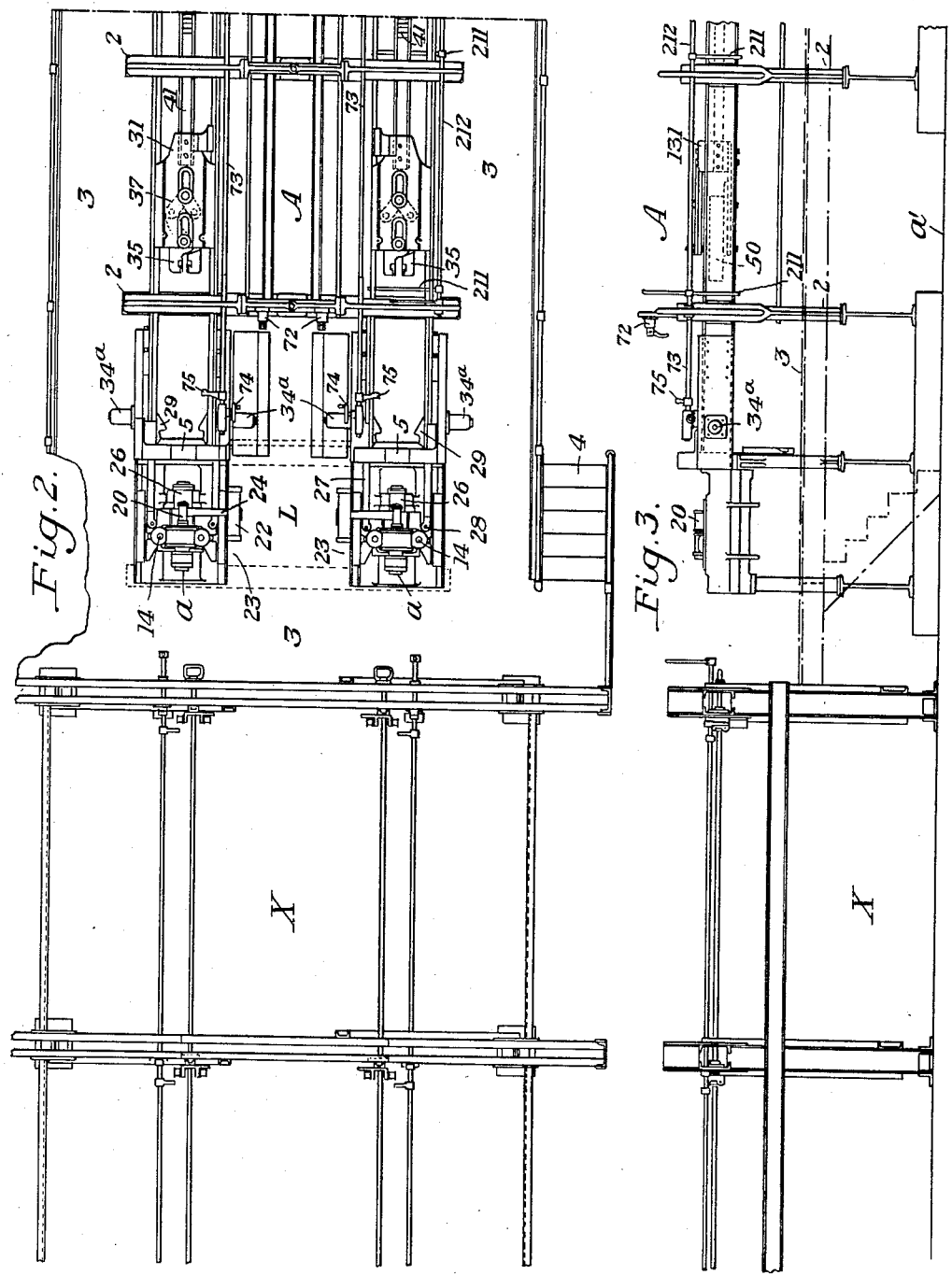

June 30, 1931. J. T. MOLTRUP 1,812,359
METHOD AND MEANS FOR THE PRODUCTION OF DRAWN METAL RODS
Filed April 6, 1928 17 Sheets-Sheet 3
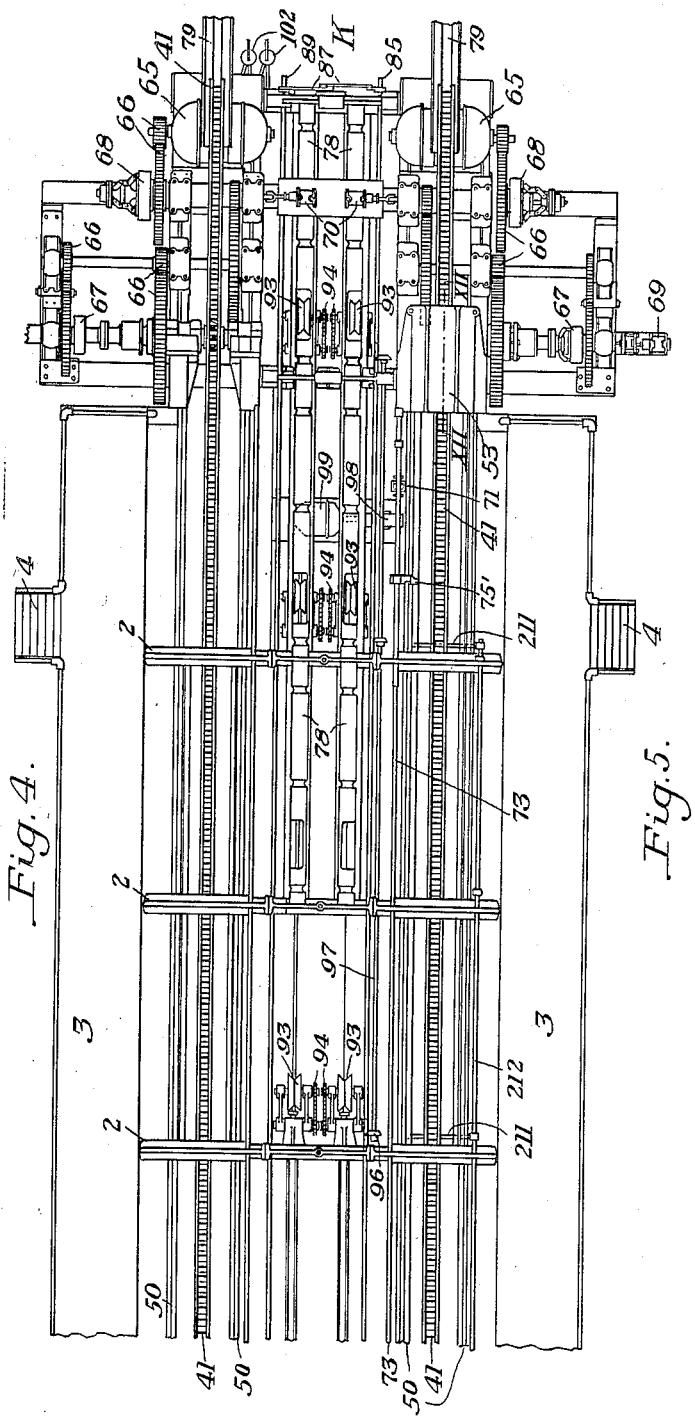
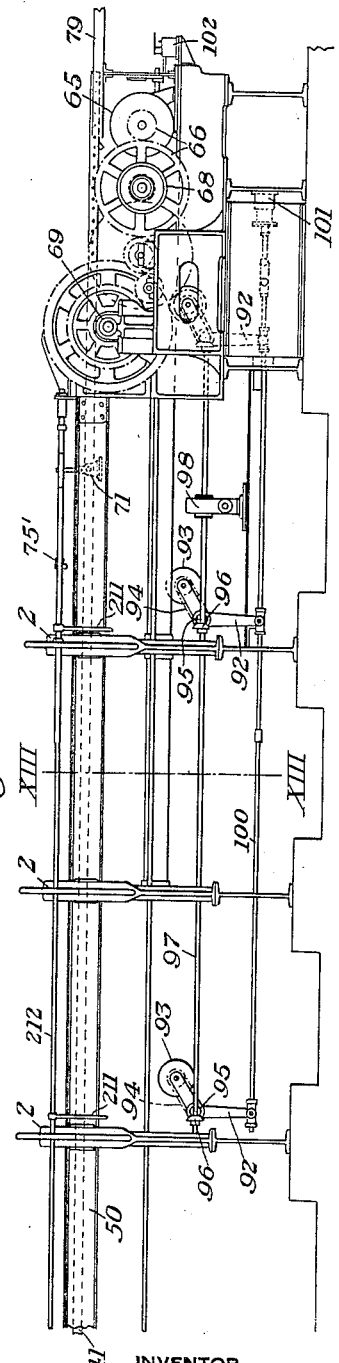
INVENTOR
James T. Moltrup
by Byrne, Stebbins & Parmelee
his attorneys June 30, 1931. J. T. MOLTRUP 1,812,359
METHOD AND MEANS FOR THE PRODUCTION OF DRAWN METAL RODS
Filed April 6, 1928 17 Sheets-Sheet 4
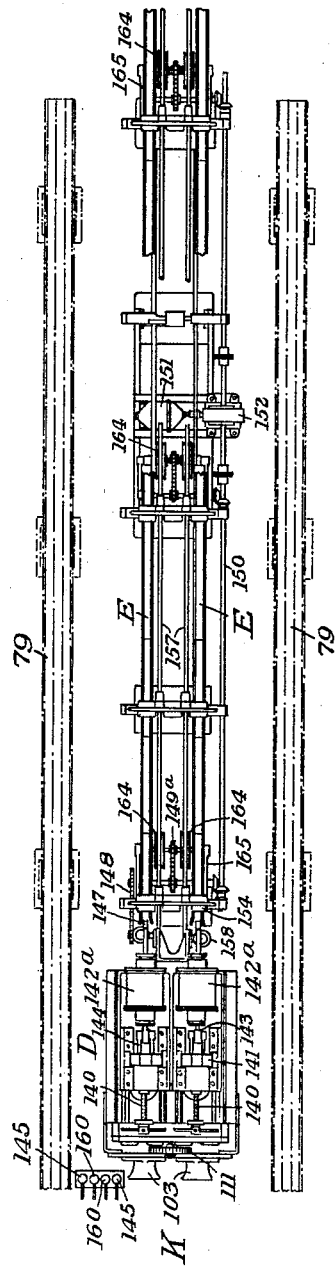
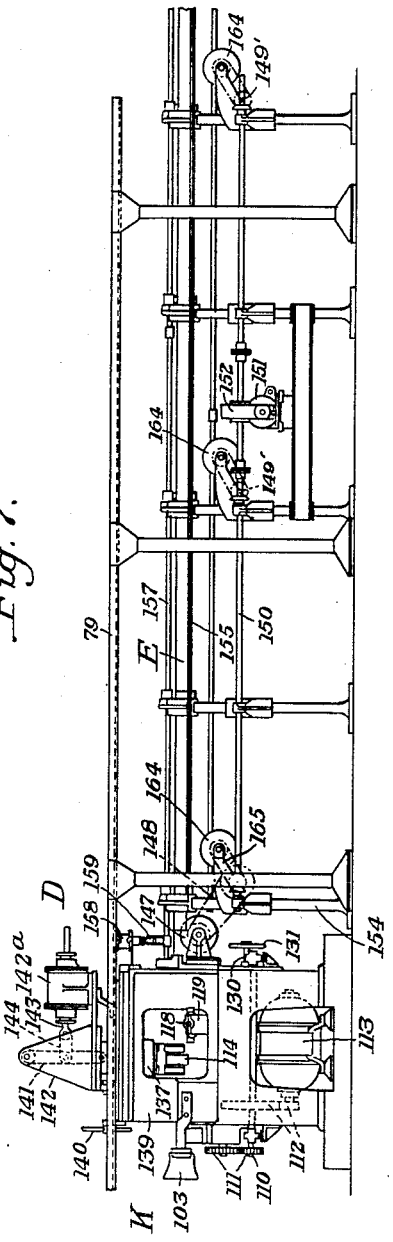
INVENTOR
James T. Moltrup
by Byrnes, Stebbins & Parmelee
his attorneys June 30, 1931. J. T. MOLTRUP 1,812,359
METHOD AND MEANS FOR THE PRODUCTION OF DRAWN METAL RODS
Filed April 6, 1928 17 Sheets-Sheet 5
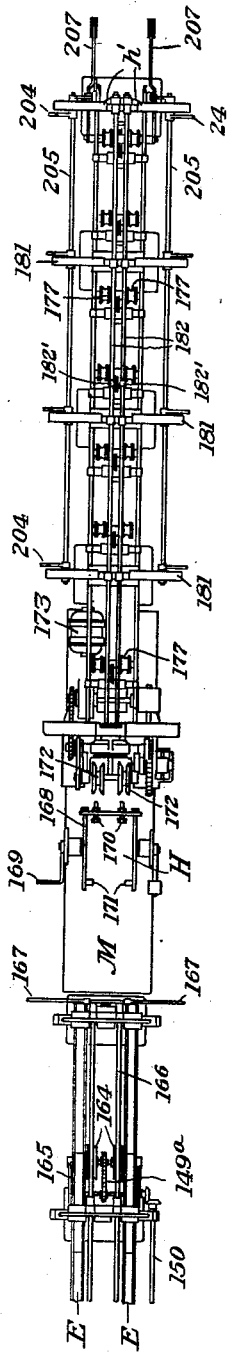
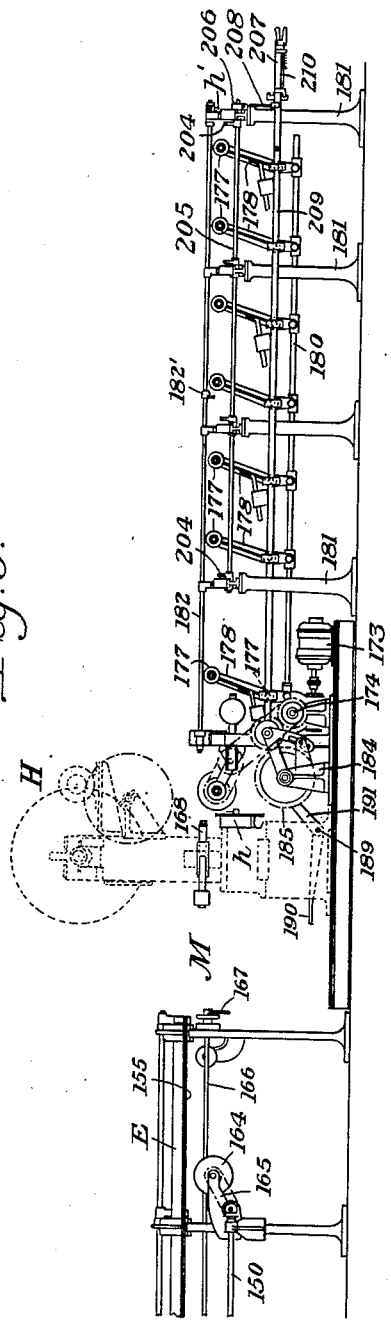
INVENTOR

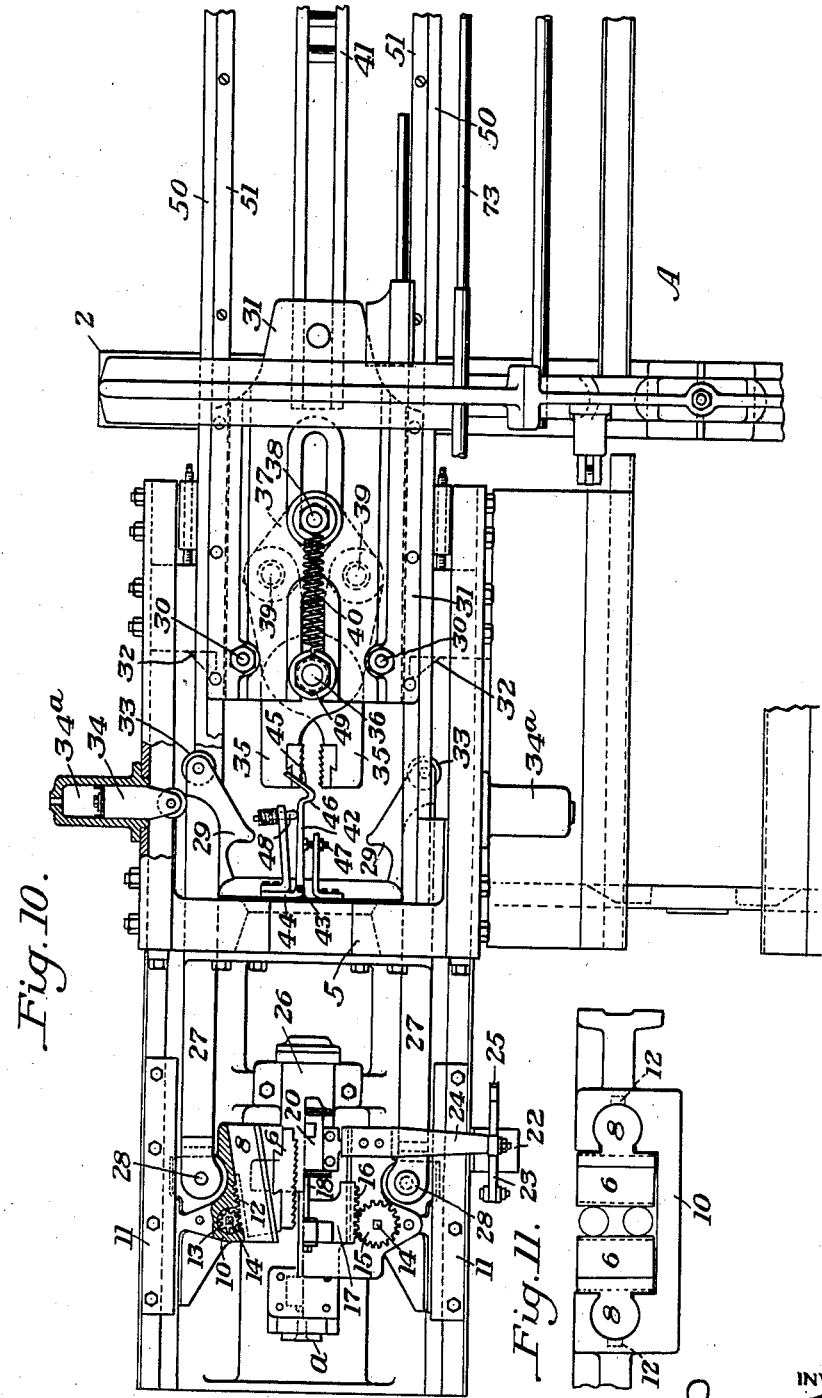

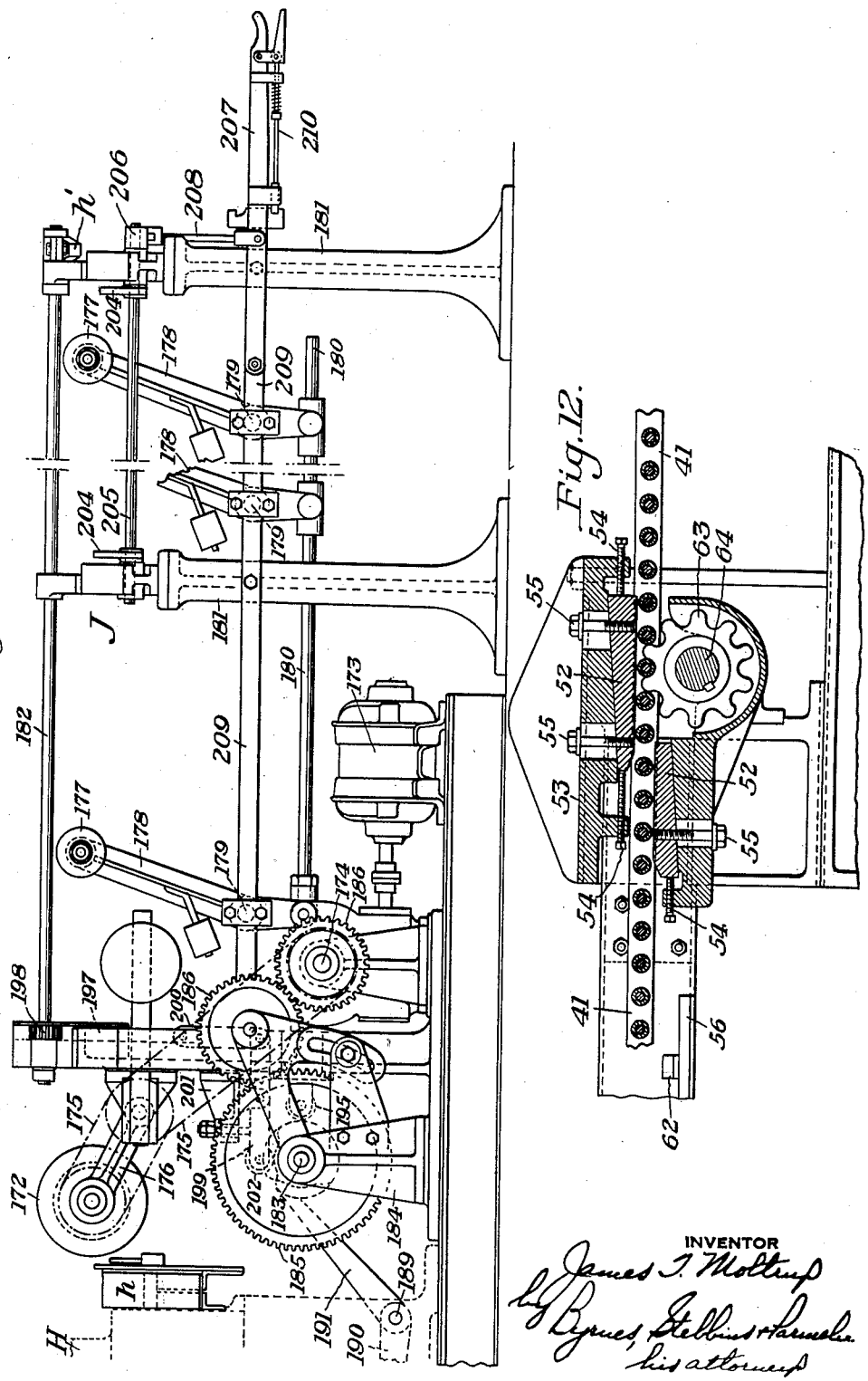

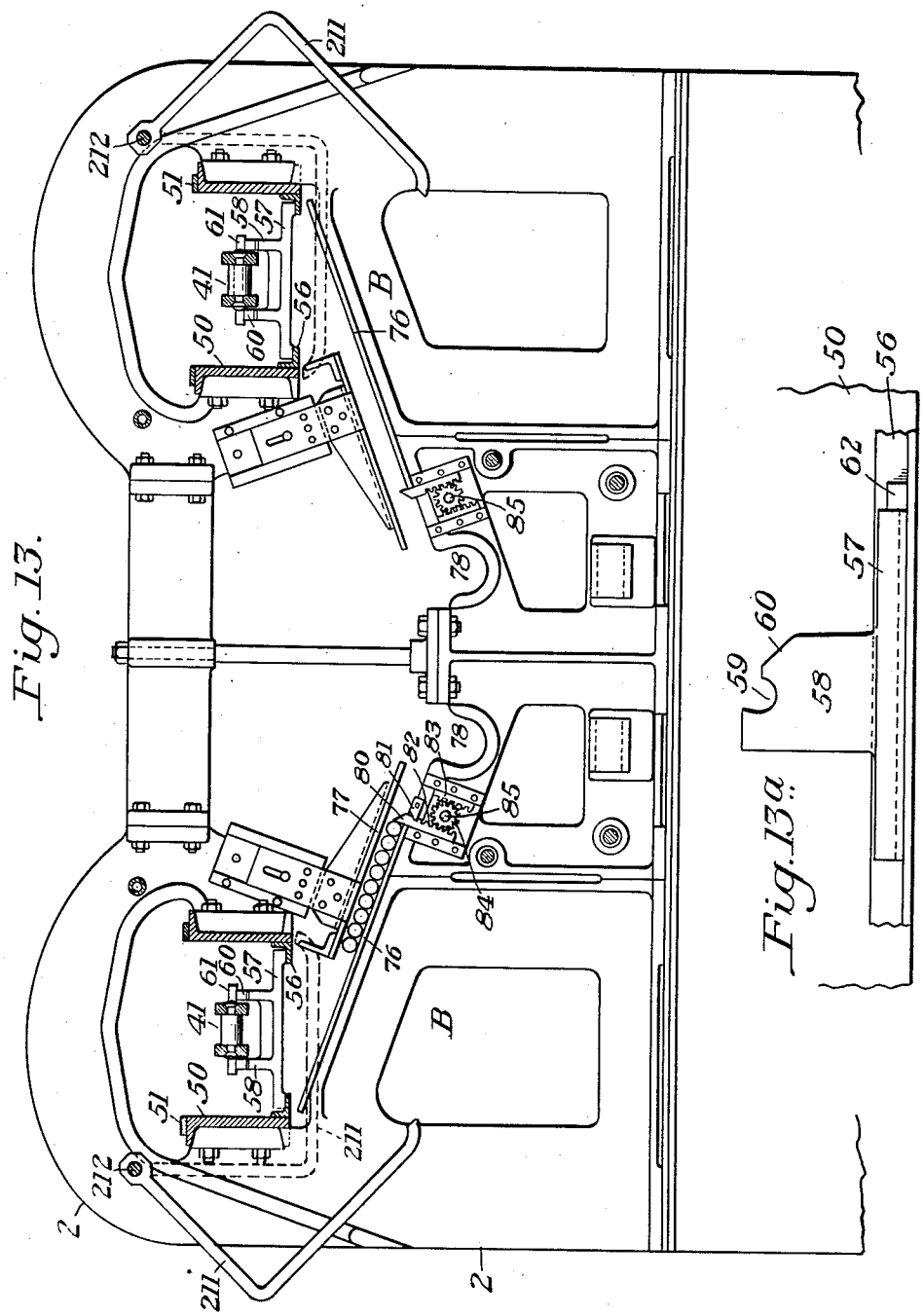

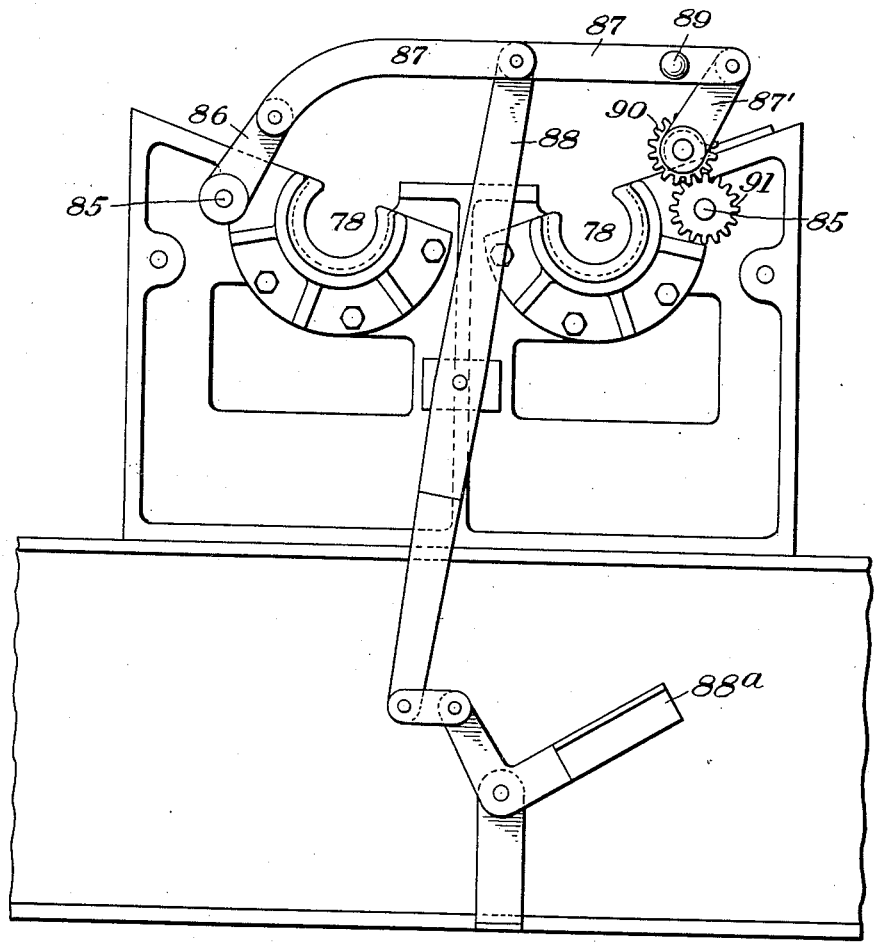

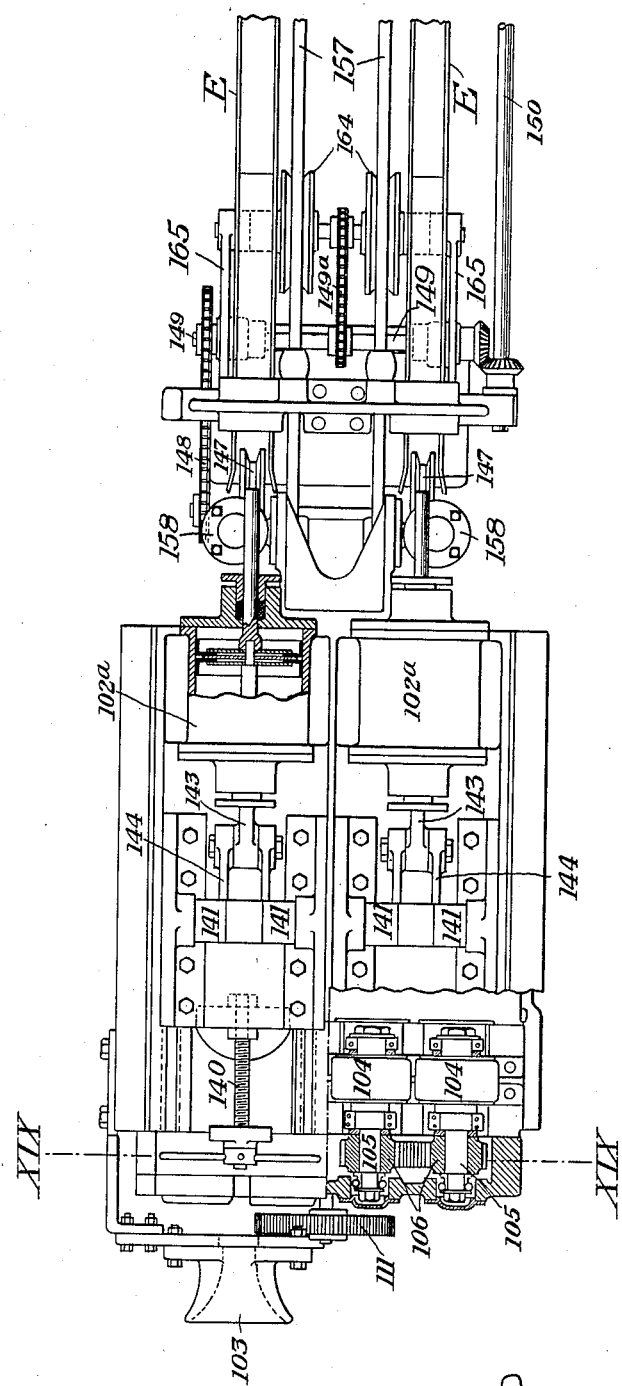

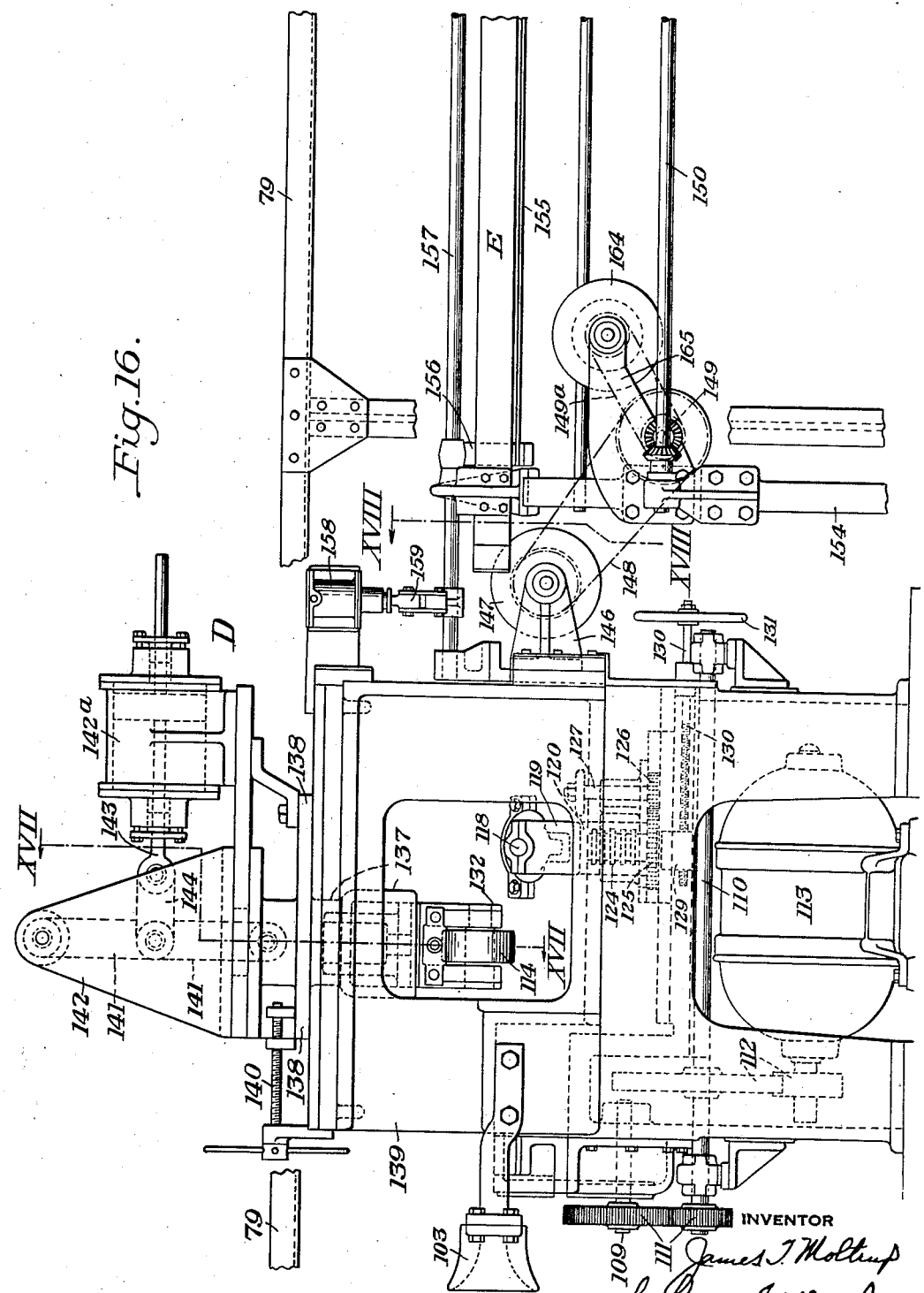

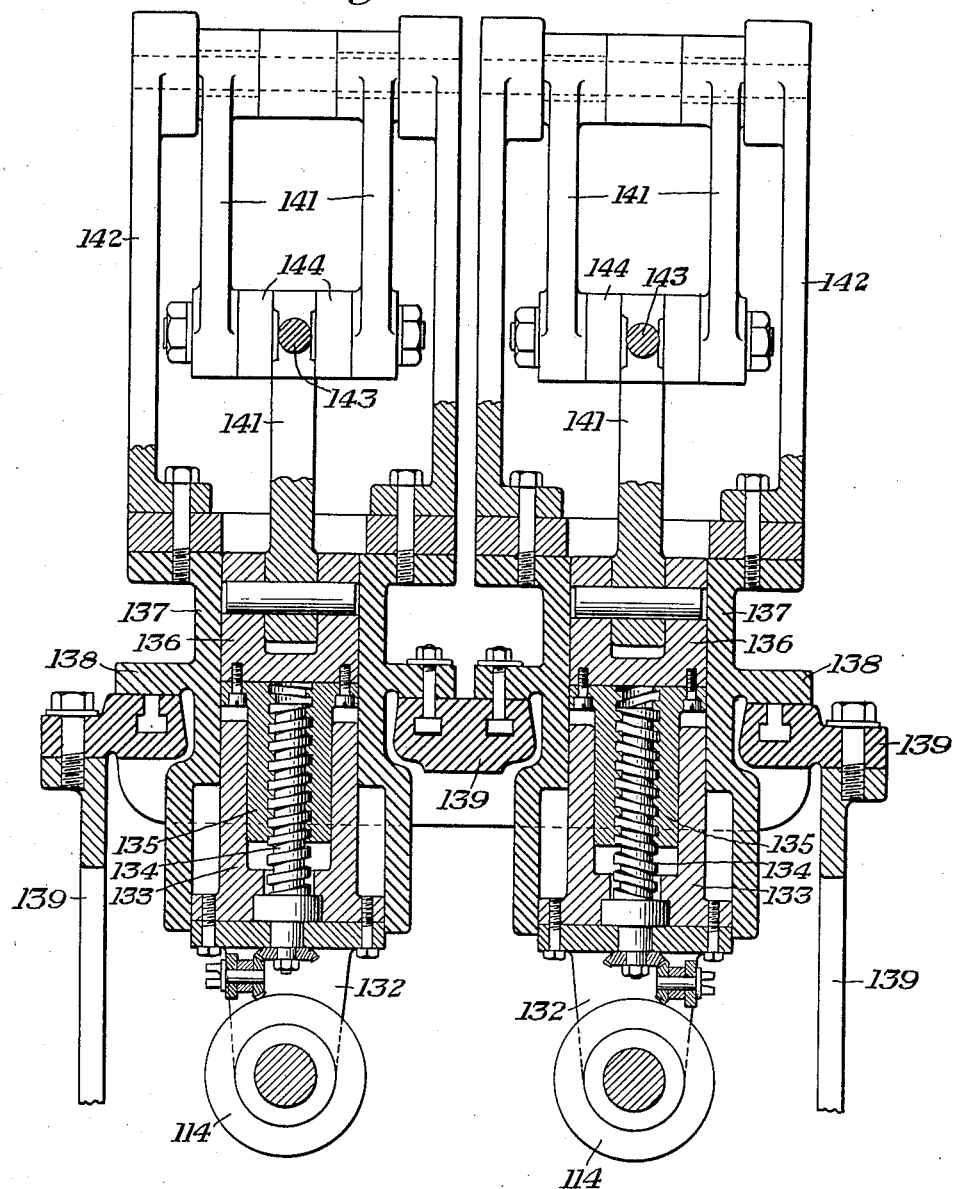

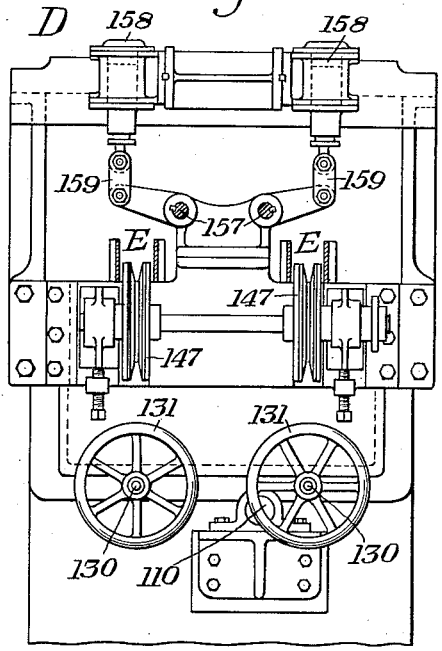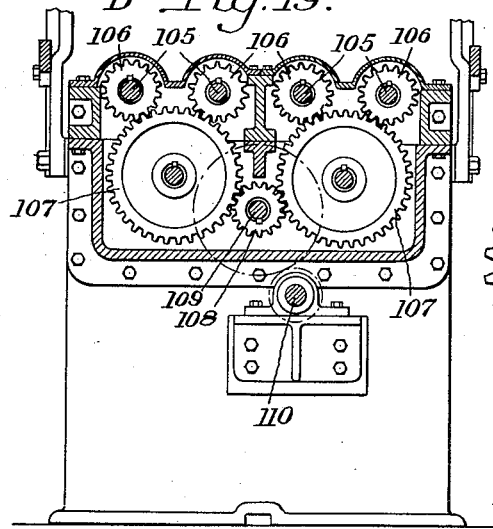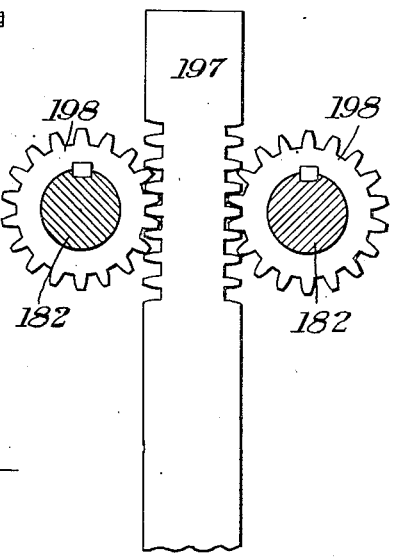

June 30, 1931. J. T. MOLTRUP 1,812,359
METHOD AND MEANS FOR THE PRODUCTION OF DRAWN METAL RODS
Filed April 6, 1928 17 Sheets-Sheet 14
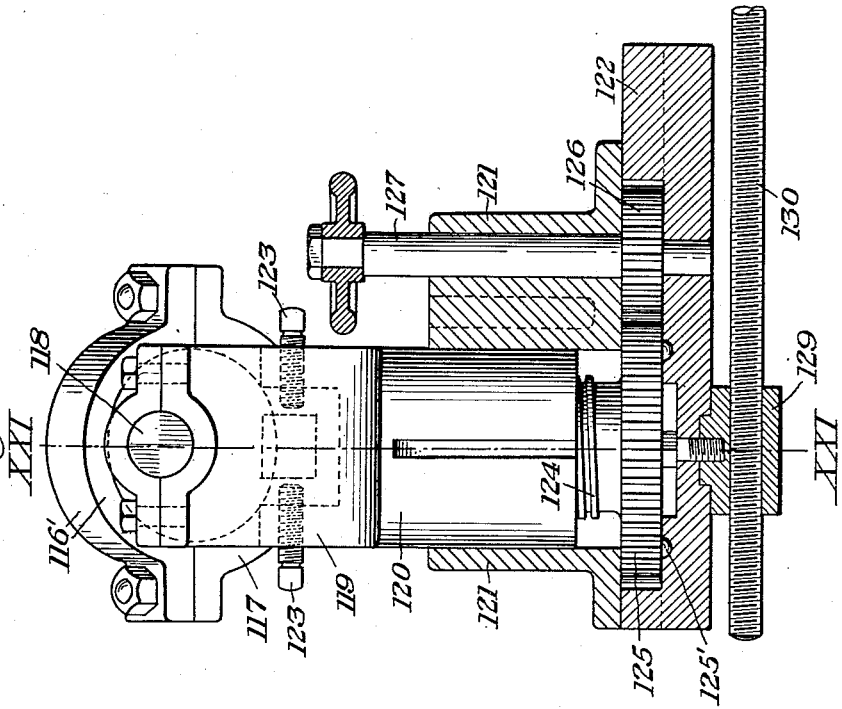
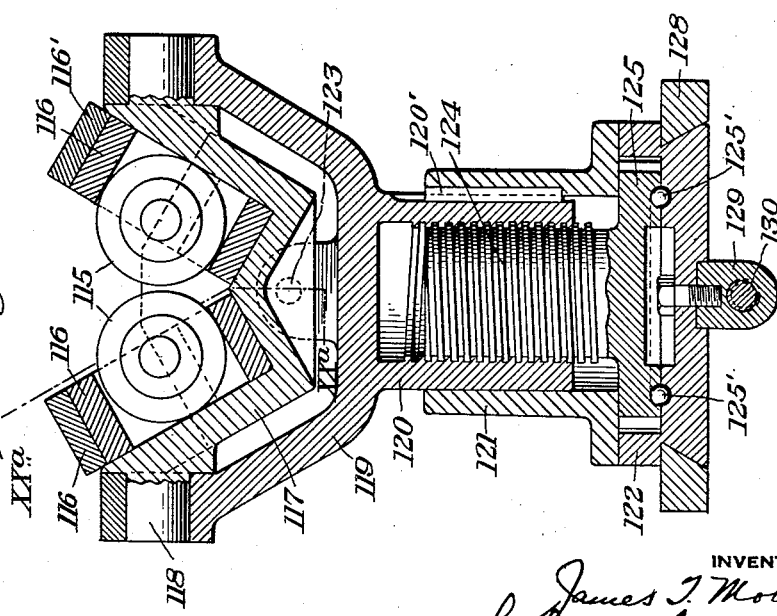
INVENTOR
James T. Moltrup
by Byrnes Stebbins & Parmelee
his attorneys Fig. 20ª
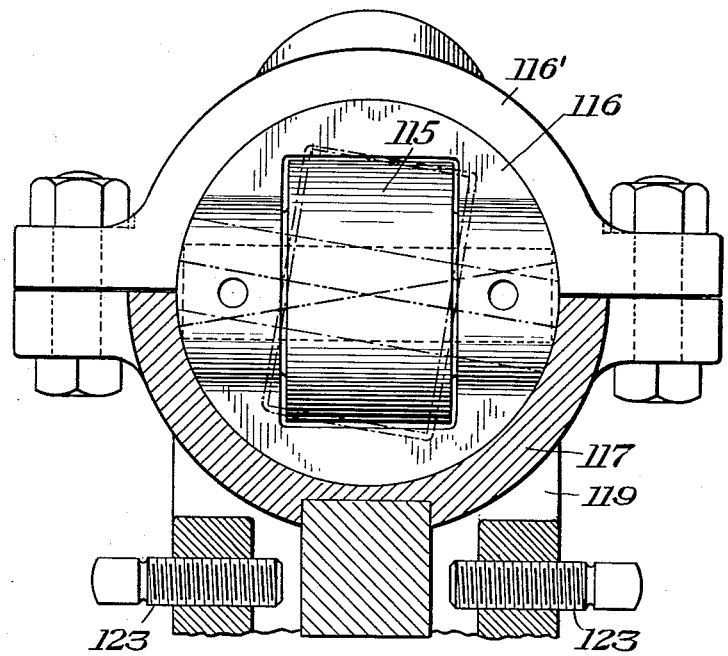
Fig. 21ª
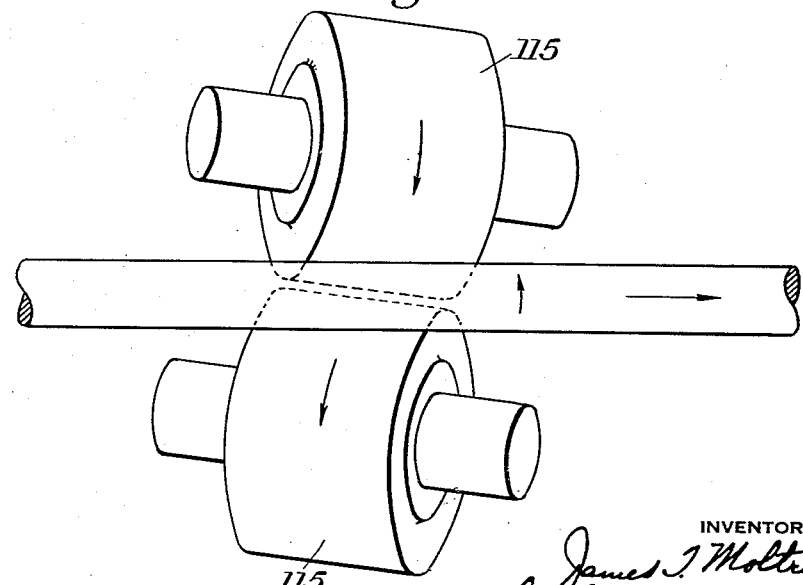

June 30, 1931. J. T. MOLTRUP 1,812,359
METHOD AND MEANS FOR THE PRODUCTION OF DRAWN METAL RODS
Filed April 6, 1928 17 Sheets-Sheet 16

INVENTOR
James T. Moltrup

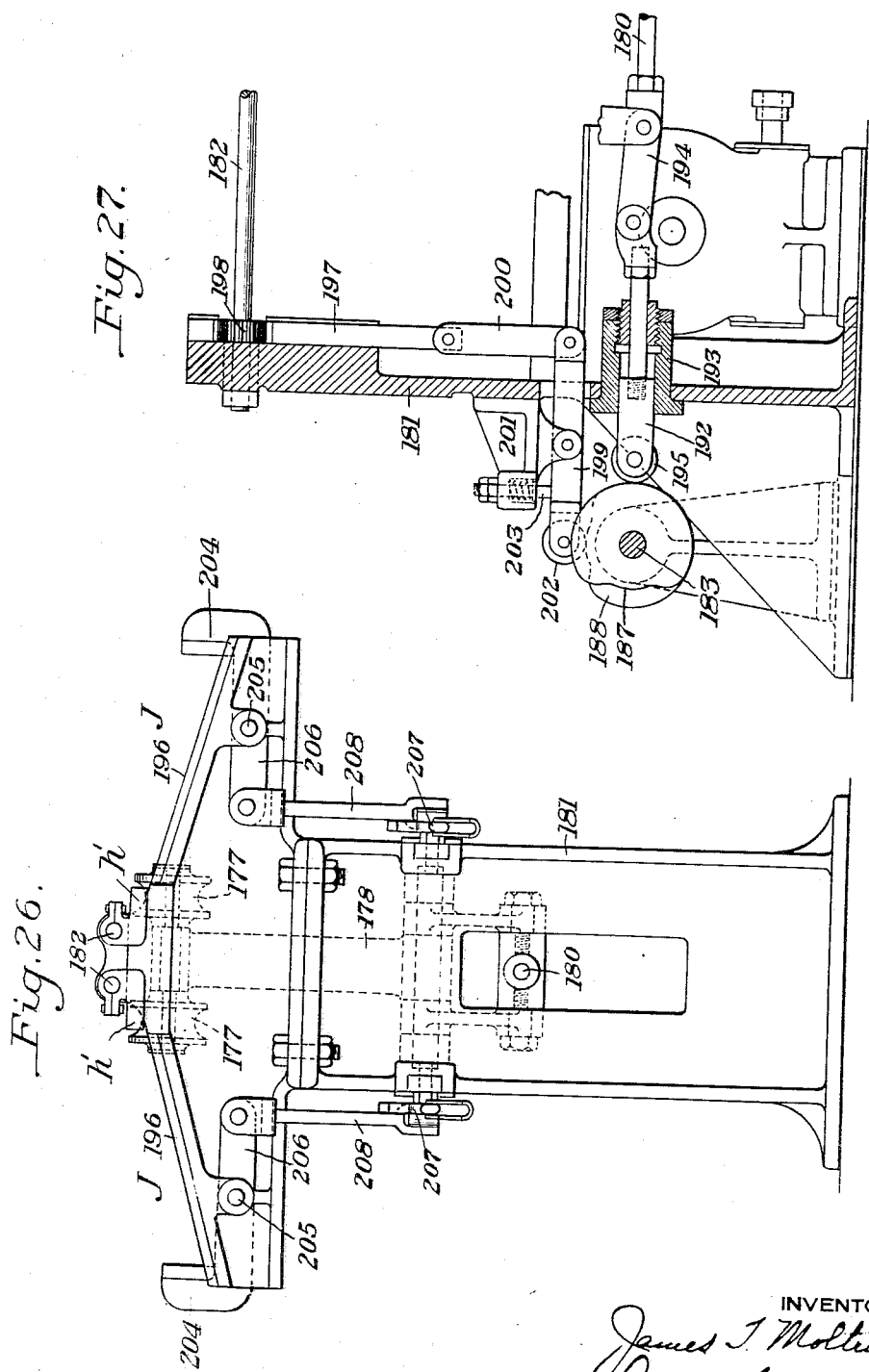

Patented June 30, 1931

1,812,359

UNITED STATES PATENT OFFICE

JAMES T. MOLTRUP, OF BEAVER FALLS, PENNSYLVANIA

METHOD AND MEANS FOR THE PRODUCTION OF DRAWN METAL RODS

Application filed April 6, 1928. Serial No. 267,875.

This invention relates to the art of metal working and more particularly to the art of producing cut to length drawn metal rods in a continuous manner.

In carrying out my invention the rods are first drawn in long lengths, straightened and then cut to the desired length, in a continuous manner.

In the drawings I have shown one form of machine embodying my invention, which comprises a draw bench for drawing the rods, a receiving rack into which the drawn rods are deposited in successive order, transfer mechanism for delivering the drawn rods to a straightening machine, a receiving rack for receiving the straightened rods, a cracker or shears for cutting the drawn rods to length, transfer mechanism for delivering the straightened rods to the shears, a receiving rack for receiving the cut to length rods as they come from the shears and from which they are delivered to trucks to be transferred to a ware-house or other suitable points.

In the drawings:

Fig. 1 is a diagram illustrating the general layout of the machine;

Fig. 1ª diagrammatically illustrates the mechanism for closing the rod pushing mechanism, in front of the dies;

Fig. 2 is a plan view of the front end of the draw-bench portion of the machine;

Fig. 3 is a side elevation of the portion of the machine shown in Fig. 2;

Fig. 4 is a plan view of the rear portion of the draw bench;

Fig. 5 is a side elevation of the portion of the machine shown in Fig. 4;

Fig. 6 is a plan view of the straightener;

Fig. 7 is a side elevation of the straightener;

Fig. 8 is a plan view of the shears, together with a portion of the feed mechanism therefor and the receiving table for the cut rods;

Fig. 9 is a side elevation of the portions of the machine shown in Fig. 8;

Fig. 10 is a plan view of the front portion of the drawing mechanism on a larger scale;

Fig. 11 is an end view of the gripping jaws for pushing the rods through the dies;

Fig. 12 is a sectional view on the line XII—XII of Fig. 4;

Fig. 13 is a sectional view on the line XIII—XIII of Fig. 5;

Figure 22:
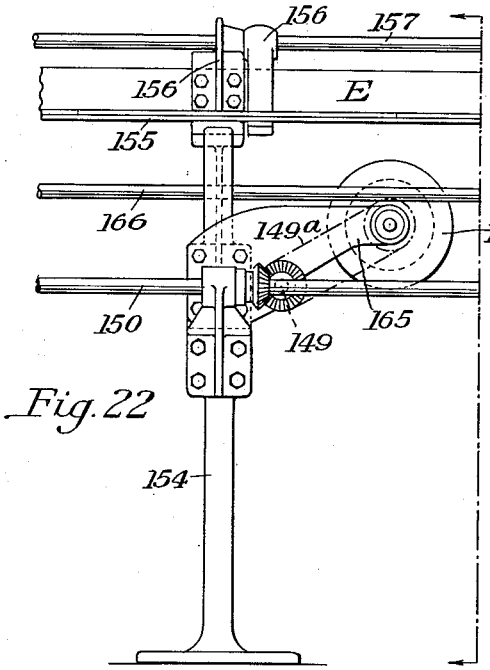
Figure 23:
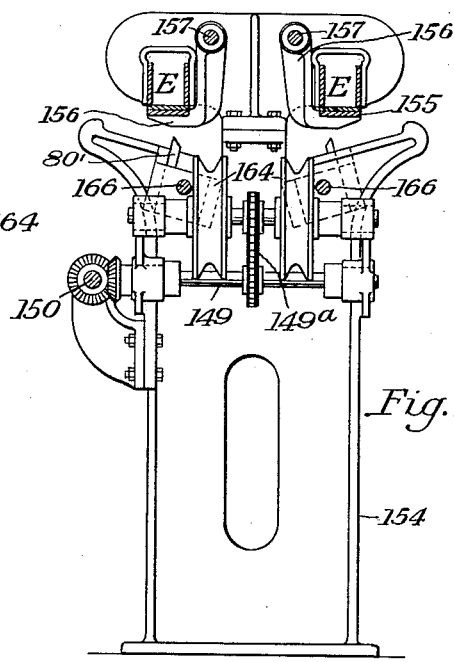
Figure 24:
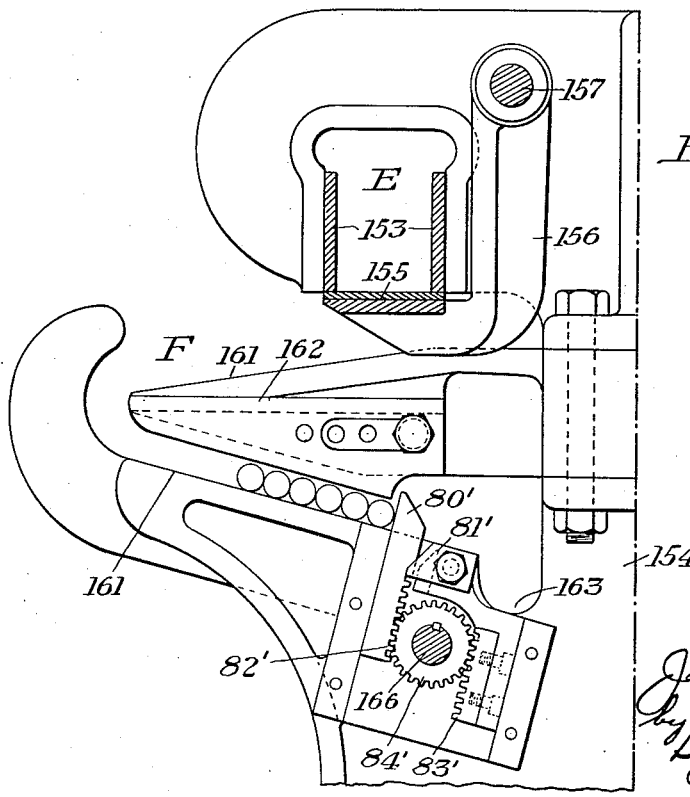

Fig. 13ª is a side elevation of the sliding support for the drawing-gripper rack bar;

Fig. 14 is an end view of the guides for delivering rods to the straightener;

Fig. 15 is a plan view of the straightener;

Fig. 16 is a side elevation of the straightener;

Fig. 17 is a detail sectional view on the line XVII—XVII of Fig. 16;

Fig. 18 is a similar view on the line XVIII—XVIII of Fig. 16;

Fig. 19 is also a similar view on the line XIX—XIX of Fig. 15;

Fig. 20 is a detail side elevation partially in section of a universal bearing for one of the sets of rollers in the straightener;

Fig. 20ª is a detail sectional view on the line XXª—XXª of Fig. 21, looking in the direction of the arrows;

Fig. 21 is a sectional view on the line XXI—XXI of Fig. 20;

Fig. 21ª is a diagrammatic top plan view indicating one angular relationship of the straightening rollers;

Fig. 22 is a side elevation of a portion of the rack for receiving the rods for the straightener and a portion of the mechanism for delivering the rods to the shears;

Fig. 23 is an end view of the mechanism shown in Fig. 22;

Fig. 24 is a detail sectional view on the line XVIII—XVIII of Fig. 16 looking in the opposite direction to that of Fig. 18, and on a larger scale;

Fig. 25 is a side elevation of the rod handling mechanism beyond the shears;

Fig. 26 is an end view of the mechanism shown in Fig. 25;

Fig. 27 is a detail sectional view of a portion of the rod handling mechanism shown in Figs. 25 and 26; and Fig. 28 is a similar view of another portion of rod handling mechanism shown in Figs. 25 and 26.

The machine in general, as illustrated diagrammatically in Fig. 1, comprises a draw bench indicated by the reference letter A having means for drawing the rods through a shaping die $a$; a rack B for receiving the bars as they are released from the drawing mechanism; feed mechanism C for delivering the rods from the rack B to a straightener D in which the rods are straightened. From the straightener the rods are delivered to a clapper box E above a second receiving rack F. The straightened rods are dropped from the clapper box to the rack F from which they are delivered by a second feed mechanism G to a shear H, where the straightened rods are cut to predetermined lengths and delivered to a receiving rack J, from which they are delivered to a suitable means for transportation to the shipping room, warehouse or other suitable point.

In the foregoing description I have merely described the general outlay shown in Fig. 1, but in Figs. 2, 4, 6 and 8 I have shown in plan a continuous apparatus with two complete equipments for handling rods from the time they are fed to the dies to the time the cut to length rods are positioned on the racks J for delivery to the trucks for removal for shipping. Figs. 3, 5, 7 and 9 also illustrate in side elevation a complete apparatus shown in plan in the above figures.

The two draw benches, which extend from a short distance in back of a rod supply table X in Figs. 2 and 3 to a point considerably beyond the straighteners D in Figs. 6 and 7, are elevated to quite an extent above the shop floor $a'$. They are supported on frame work 2, carrying a platform 3, to which steps 4 lead from opposite sides and ends of the apparatus. The draw benches are also spaced apart a sufficient distance to permit placing the straighteners D between the guides for the rack bars of the draw-benches.

These draw-benches, as well as the grippers for pushing the rods into the dies and for pulling the rods through the dies, are similar to the apparatus shown in my former Patent, 1,298,999, of April 1, 1919, and as the two draw-benches as well as the other parts of the apparatus on the two sides of the longitudinal center thereof are duplicates, I will merely describe one set of mechanisms.

The die or dies $a$, through which the rods are first pushed and then drawn, are mounted in a cross-head 5 forming part of the frame between a rod pushing gripper and a pulling gripper, see Fig. 10.

The pushing gripper comprises a pair of jaws 6, having flanges 8 of generally cylindrical cross section mounted in similarly shaped guides in a cross-head 10, movable between guides 11 on the frame of the machine, for a sufficient distance to push the bar or bars through the dies far enough to permit them to be grasped by the jaws of the pulling gripper, as hereinafter described.

Racks 12 on the flanges 8 of the pushing grippers, are engaged by pinions 13 on shafts 14 rotated to close the jaws onto the bars or to open them to release the bars after they have been pushed through the dies.

Connected to the upper end of each shaft 14 is a gear 15 which engages a rack 16 connected to a cross-head 17 secured to a piston rod 18. This rod projects from a piston 19 within a cylinder 20, moved in both directions by fluid pressure from a suitable source controlled by a valve 21, see Figs. 10 and 1ª.

The valve 21 is located in a casing 22, and extending therefrom is an operating handle 23, actuated by an operator whose station is located between the two draw-benches, to shift the valve to move the piston to close the jaws 6. Connected to the cross-head 10 for movement therewith is an arm 24 arranged to engage an arm 25 connected to the stem of valve 21, to shift the valve and consequently the pressure in cylinder 21 to open jaws 6 when the rods have been pushed a predetermined distance through the dies.

As shown in Fig. 11, the jaws 6 are adapted to rock slightly about axes which are coincident with the centers of the flanges 8. By this arrangement the jaws may uniformly engage two bars to push them through dies of any desired construction, such as shown in my application Serial No. 216,820, filed September 1, 1927, even though the bars are not exactly the same diameters, and apply substantially the same gripping pressure to both rods.

Fixedly mounted below the jaws 6 on the frame of the draw-bench, is a cylinder 26, having a piston therein having a piston rod which is in turn connected to cross-head 10. Fluid under pressure is continuously applied to one end of the cylinder 26 tending to push cross-head 10 and jaws away from the die, in a manner similar to that shown in my Patent 1,298,999.

The cross-head 10 is moved forwardly to push the rods through the die by means of clutch links 27, which engage roller pins on the pulling gripper as disclosed in the above patent.

The clutch links 27 (Fig. 10) are pivoted at their rear ends to the cross-head 10 at 28, while their forward ends are provided with hooks 29, adapted to engage roller pins 30, on the draw head 31 when the draw head is in its extreme return position. Stationary cams 32 engage rollers 33 on clutch links 27 to release the hooks 29 after the pushing gripper has pushed a rod through the die. Pneumatic plungers 34 carrying rollers resist outward movement of the clutch links 27 by fluid pressure which is constantly admitted to cylinders 34ª from the pressure supply.

The pulling gripper jaws 35 are pivoted to each other by a pin 36, arranged to move in guide slots in the upper and lower plates of the draw head 31. Toggle levers 37 are pivotally connected to each other at one end by a pin 38, also adapted to move in slots in the draw head plates. The other ends of the toggle levers are pivotally connected at 39 to the rear ends of the jaw levers 35. A relatively light tension spring 40 is connected to pins 36 and 38 to urge the pins toward each other and open the jaws. A rack bar 41 is connected to the head 31 for moving the pulling gripper toward and from the die.

The gripper jaw holding mechanism for holding the jaws 35 in rod receiving position adjacent the die, during the initial outward movement of draw head 31, differs somewhat from that shown in my above mentioned patent, but functions in the same general manner. This holding mechanism comprises a lever 42, pivoted at 43 to a bracket 44, connected to the die holding cross-head 5. The outer end of lever 42 is provided with a cam surface 45, an engaging hook 46, an adjustable stop screw 47, and a spring pressed plunger 48.

In the operation of the rod drawing mechanism, the drawing gripper is continuously reciprocated unless stopped by the operator, and is automatically reversed at both ends of its stroke, by mechanism hereinafter described. The pushing gripper parts are in the position shown in Fig. 10, during the greater part of the drawing movement of the drawing grippers as well as during the entire return movement thereof.

The reversing mechanism is so set that a reversal of the drawing grippers takes place just as the jaws are about to engage the cross-head 5. During the return movement of the drawing grippers and just before the reversal takes place, a roller 49 on pin 36 rides over cam face 45, and moves lever 42 against the action of spring plunger 48. Just as roller 49 passes the high point of the cam and the hook 46 is moved into engagement with the roller 49 by the plunger 48, the movement of the drawing gripper will be reversed.

During the return movement of the drawing gripper, the operator will position a rod in the mouth of the die after passing it between the jaws 6 of the pushing grippers, and as soon as he has positioned the rod he will actuate lever 23 of valve 21, to cause fluid to enter the cylinder 20 at the proper end to close jaws 6 onto the positioned rod, so that the pushing gripper is set to push the rod through the die on the return of the pulling gripper.

As the pulling gripper is returned, and just before the reversal takes place, roller pins 30 will pass hooks 29 on links 27. The links are pushed back against the plungers 34 by the roller pins 30 which engage the inclined faces of the hooks 29, and as soon as the rollers pass the ends of the hooks the plungers 34 will press the hooks into engaging positions. It will thus be seen that all of the parts are set for drawing a rod at the time the reversal of movement of the pulling gripper takes place.

At the beginning of the drawing movement the jaws 35 of the drawing gripper will be held open by spring 40 and also held against movement with the draw head 31 by the engagement of hook 46 with roller 49, and the positioned rod will be pushed through the die by jaws 6, through the link connection between draw head 31 and pushing gripper. As the rollers 33 engage cams 32 to release links 27, the end of the rod will have been pushed between jaws 35 a sufficient distance to be gripped thereby. Just before the links 27 are released, arm 24 will engage valve lever 25 to thereby reverse the pressure in cylinder 20 and open jaws 6. As soon as links 27 are released the pushing gripper will be returned to the position shown in Fig. 10.

During the initial drawing movement of head 31, the jaws 35 will be held against movement therewith by the hook 46, and will be so held until the left hand end of the slot in the plates of the draw head 31 engages pin 38. When this occurs, the jaws 35 will have been closed onto the end of the rod to be drawn, as the jaws are held against movement with the draw head 31 with sufficient resistance to insure closing of the jaws against the rod. After the jaws 35 have closed on the rod, further separation of pins 36 and 38 is arrested, and roller 49 will then be drawn from engagement with hook 46, and the rod will be drawn through the die by the drawing gripper and will continue to be drawn under normal conditions until the rod is drawn through the die. After the rear end of the rod has passed through the die, the pull on the jaws 35 will cease, and when this occurs, the spring 40 will open the jaws 35 and release the drawn rod which will drop into the receiving rack B (Fig. 13) below the draw-bench.

The drawing gripper will be moved a short distance beyond the point where the rear end of the rod passed through the die, where its movement will be reversed automatically, and as the movement of the draw head is arrested and reversed, the momentum and inertia of the jaws 35 will cause the pin 38 to be moved to the right end of the slot in the plates of the draw head and thus jaws 35 will be fully opened and in position for the next draw. However, if the jaws have not been fully opened and positioned as above described, they will be so positioned when roller 49 engages cam surface 45 on lever 42, before the lever is moved against the action of plunger 48.

The draw head 31 is movably mounted on and between channel iron guides 50 having running or bearing strips 51 connected thereto for supporting the weight of the drawing gripper, see Figs. 10 and 13.

Each rack bar 41 is formed of two bars interconnected by pins with rollers thereon between the bars, and is supported, and held against by vibration, by a pair of tapered blocks 52, in a bearing housing 53, see Figs. 4 and 12. These blocks are adapted to be adjusted by screws 54 and locked in position by bolts 55. Resting on angle bars 56 (Fig. 13) connected to channel bars 50, is a sliding support 57 for the rack bar. This support has a pair of standards 58 spaced to form guides to prevent lateral swaying of the rack bar. These standards are provided with arcuate recesses 59 (Fig. 13$^a$) having a relatively high wall at the back, while the wall at front merely extends to about a horizontal line passing through the center of the arc and is flared outwardly to a slight extent.

The front face of each standard 58 is provided with a cam surface 60, and is arranged to cause the projecting ends 61 of one of the roller pins of the rack bar to ride up the cam surfaces 60, drop into the recesses 59 and move the support along its guides.

The support is arranged to travel back and forth from a stop 62 (Figs. 12 and 13$^a$) adjacent bearing housing 53 to a point about midway between housing and the rear end of the drawing gripper when said gripper is at the end of its return movement. At the beginning of the draw the support 57 is about midway between the housing 53 and the back of the draw head 31, and as the rod is drawn, support 57 will travel along its guides 56 with the rack bar until it engages stop 62. When the support 57 is brought to rest by stop 62, pins 61 will move out of recesses 59 in the support and the support will remain against the stop 62 until the rack bar completes the drawing movement, is reversed, and pins 61 travel back to the recesses 59 in the support. It will then move with the rack bar during the remainder of the return movement of the rack bar and the first part of the drawing movement.

Each rack bar 41 is reciprocated by a sprocket wheel 63 (Fig. 12), on a shaft 64, driven from a motor 65 (Figs. 4 and 5) and interposed direct and reversing gearing 66 having therein a reversing clutch 67 and a main clutch 68. Reversing clutch 67 is actuated by a piston in a cylinder 69, while the main clutch is actuated by a piston in cylinder 70. These pistons are connected directly to their clutches by piston rods and are positively actuated in both directions by fluid pressure controlled by valves 71 (Figs. 4 and 5) and 72 (Figs. 2 and 3), respectively.

Valve 71 is located at the driving gearing end of the bench and is actuated by a reciprocating reversing rod 73, which extends from the bearing housing 53 to the operator's station L (Fig. 2) where a hand wheel 74 is provided by which the operator can reverse the valve and consequently the movement of rack bar 41, whenever desired. Connected to reversing rod 73 at the die end is a tappet arm 75 which is engaged by the drawing gripper to automatically reverse the movement of the rack bar at the end of the return movement. A similar arm 75' is adjustably connected to the rod at the other end of the machine for automatically reversing the rack at the end of the drawing movement.

The reversing mechanism including the clutch 67 and its actuating mechanism is so arranged that rack bar driving shaft 64 is always connected to gearing 66, and when it is desired to stop the machine, the main clutch 68 is actuated to disconnect driving gears 66 from motor 65. Valve 72 for controlling the flow of fluid to cylinder 70 for actuating the main clutch is located at the operator's station and is connected by suitable piping to the cylinder 70 at the other end of the machine.

In the normal operation of the machine the draw head 31 is alternately reciprocated in a continuous manner and draws a rod for each cycle of two reciprocations. All the operator is required to do is to position a rod in the die and between jaws of the pushing gripper after the previously positioned rod has been drawn through the die. If the operator desires to stop the machine, he reverses valve 72, and when ready to start the machine he again shifts valve 72, to actuate main clutch 68.

As previously stated, the drawn rods are dropped into the receiving rack B (Fig. 13) which comprises a sloping runway formed between a ledge 76 on the major portion of the standards of the frame 2, and guides 77 supported on said standards for adjustment toward and from ledges 76, in order to provide a suitable runway for rods of different diameters, and prevent piling of the rods.

The rods from each receiving rack are successively fed to a feed trough 78 by feed mechanism, shown in Figs. 13 and 14, under control of the straightening machine operator whose station is located at K (Fig. 4) between the end of receiving rack for the drawn rods, and the straightening machine. From the trough 78 drawn rods pass through the straightening machine D as hereinafter described in detail. The feeding mechanism controlling the passage of the rods from the feed racks into the troughs 78 is shown in detail in Fig. 13 and comprises reciprocating fingers 80 and 81 mounted on each of the intermediate stands of frame 2. These fingers are provided respectively with racks 82 and 83 lying on opposite sides of and engaged by an intermediate gear 84 on an actuating shaft 85. This actuating shaft is journaled in suitable bearings in the standards.

The end of one of the shafts 85 at the operator's station K is provided with a crank 86 (Fig. 14), connected to a link 87 which is in turn connected to the upper end of a lever 88, adapted to be actuated by the operator of the straightener by means of foot lever 88ª, or by a handle 89 on the link 87 connected through arm 87' to pinion 90. This pinion meshes with a similar pinion 91 on shaft 85 on the feed mechanism of the other unit.

As the feed fingers 80 and 81 of one unit are necessarily reversed from that of the other unit it is necessary to rotate shafts 85 in the reverse directions for feeding rods to the two troughs 78, so that the linkage above described is connected directly to one shaft 85 and to the other through the medium of reverse gearing 90 and 91.

Referring now to Fig. 24 which illustrates the feed fingers 80' and 81' for feeding rods to the shear H, but which are identical with fingers 80 and 81 shown in Fig. 13, finger 81' is provided with an adjustable nose which is arranged to be adjusted toward and from finger 80', so that various diameters of rods can be handled without danger of feeding two rods of small diameter and with a certainty of feeding a rod of large diameter, each time the linkage is reciprocated. When the operator at the straightener desires to feed a rod to the straightener, he rocks the linkage back and forth, see Fig. 14, which first lowers finger 80 and raises finger 81 and permits a rod to roll against finger 81 from the rack. The movement of the fingers is then reversed, permitting the first rod which rolled into engagement with finger 81 to roll thereover into trough 78, while the second rod is held within the rack by finger 80. It will be noted that each time the linkage is reciprocated a rod will be fed to each trough 78, and will be delivered therefrom to the straightening machine by roller feed mechanisms now to be described.

The roller feed mechanism for feeding rods to the straightener from each trough comprises a plurality of rocker arms 92 (Fig. 5) journaled in bearings on the standards of the frame 2. Each rocker arm is provided with a grooved roller 93, driven by a link belt 94, which is in turn driven by a sprocket wheel on a short shaft 95 about which its rocker arm 92 is adapted to be rocked. The sprocket wheels on shafts 95 are driven by bevel gears 96 through the medium of a longitudinally extending shaft 97, driven by gearing in a casing 98, which is in turn driven by a motor 99 (Fig. 4).

The rollers are continuously driven by motor 99 and are normally below the feed trough 78, and do not engage the rod fed to the trough until raised by mechanism under the control of the operator at the straightener. The rocker arms 92 are all connected to a rod 100, which is reciprocated by a piston in cylinder 101, the fluid supply to which is controlled by a valve 102 at station K, see Fig. 1.

The operator at station K first feeds rods to troughs 78 as before described, then actuates one of the valves 102 for feeding a rod from the desired trough 78 to the straightener, and after the rod is gripped by the straightener, the valve 102 just actuated is reversed to lower the feed rollers 93 just raised. If the operator then desires, he can then feed a rod from the other trough 78 to the straightening machine, by actuating the other valve 102.

By reference to Figures 4, 5, 6 and 7, it will be noted that the guide troughs 79 for the rack bars 41 of the drawing unit are in overlapping relationship with respect to the straightener. By reason of this arrangement, the amount of floor space required for the complete installation is materially decreased, since a portion of the space is utilized in common by both the guides 79 and the straightening machine. Not only does this decrease the floor space, as set forth, but it speeds up the production of the machine since the necessary longitudinal travel of the drawn material is decreased by the actual amount of overlapping, it being apparent that if the machines were arranged in end to end relationship it would be necessary for the drawn material to travel the full length of the guide 79 before it could be fed to the straightening machine. This enables both the drawing machine and the straightening machine to be operated at higher speeds.

This relationship has further been found desirable from the standpoint of actual results obtained, since the drawn material is fed to the straightener at such a temperature that straightening is more efficiently accomplished not only with respect to speed and accuracy, but also with respect to the power expenditure required.

The straightening machine D, as above described, is positioned adjacent the feed troughs 78 and comprises two sets of similar straightening mechanisms, one of which will only be described.

Each of the straightening mechanisms has a guide bill 103 (Fig. 16) in line with its trough 78 and the straightening rolls between which the rod to be straightened is passed.

Each straightener comprises a pair of rod drive rolls 104, on shafts 105, having pinions 106 thereon which are driven by a gear 107 (Fig. 19) which is in turn driven by a pinion 108 on a shaft 109. A shaft 110 drives shaft 109 by gears 111, and this shaft is in turn driven by a motor 113 through gears 112 (Fig. 16).

Each straightener also comprises a movable driving roller 114 (Fig. 16) and a pair of universally mounted rod supporting rollers 115 (Figs. 20, 20ª, 21 and 21ª). The rollers 115 are journaled in angularly disposed bushings 116, rotatably mounted in a yoke 117 provided with trunnions 118 journaled in a frame 119 having a stem 120 held against rotary movement in a guide 121 connected to a sliding support 122. From an inspection of the drawings, and more particularly Figs. 20 and 20ª, it will be noted that each of the bushings is clamped in the yoke 117 by means of a cap 116'. By loosening this cap, the bushings can be adjusted to any desired angularity which may be required for the best operation of the straightener. In actual practice I prefer to adjust the bushings so that the rollers 115 will assume oppositely inclined positions as indicated diagrammatically in Fig. 21ª of the drawings. This construction makes it possible to utilize rollers having a straight surface and therefore obviating the disadvantages encountered in the use of rollers having special concave surfaces, not only with respect to the length of life thereof, but also with respect to any redressing operations.

The construction thus provided is self-aligning or self-centering with respect to the material being straightened, as will be readily understood by those skilled in the art. In order, however, to maintain the yoke 117 within predetermined limits to insure such a self-centering operation with respect thereto, I preferably provide stop screws 123 in the frame 119, which stop screws are adjusted to provide any desired clearance between the same and the yoke. The entire frame 119 can be vertically adjusted by a screw 124 which engages the interiorally threaded stem 120. Screw 124 is rotated by a gear 125 on the end thereof meshing with a pinion 126 on a hand wheel operated shaft 127, journaled in a lug extending from guide 121. In order to permit any slight self-centering that may be necessary with respect to the entire frame 119 to bring the axes of the rollers 115 into the desired relationship with the material being straightened, I may support the gear 125 and its associated parts on a suitable anti-friction bearing 125', thereby permitting a slight rotational movement of the gear, the stem 120, and the frame 119 about the longitudinal axis of the screw 124. In order to prevent undue rotation of this character, there may be provided a key 120' between the stem 120 and the guide 121, which key tightly engages one of the parts and has a lost motion connection with the other of the parts, the amount of lost motion being sufficient to insure proper alignment, as before referred to. The key 120' also holds the frame 119 against complete rotation upon actuation of the hand wheel shaft 127.

The support 122 is provided with guides on its lower face which move between guides 128, connected to the bed of the straightener. Extending downwardly from support 122 is a nut 129 engaged by a screw 130 having a hand wheel 131 (Fig. 16) on the end thereof, whereby the rolls 115, together with their supporting mechanisms may be adjusted longitudinally of the machine relative to rolls 104 and 114.

The roller 114 (Fig. 17) is carried in a hanger 132 bolted to the end of a tubular guide 133 which supports an adjusting screw 134 threaded in a guide member 135, suspended from a plunger 136. The plunger 136 and tubular guide 133 are guided for vertical movement in a cylindrical guide 137 having a supporting flange 138 resting on machined faces on top of a supporting frame 139. Journaled in frame 139 and engaging a lug on flange 138 is a hand operated screw 140 by which roller 114 together with its various supporting and actuating means may be adjusted longitudinally of the machine relative to rolls 104 and 115.

The roller 114 is moved toward and from the rod to be straightened by means of toggle levers 141 connected to plunger 136 and brackets 142 mounted on the upper end of guide 137, and are actuated by a piston in a cylinder 142ª whose rod 143 is connected to the toggle levers 141 by a link 144.

The admission of fluid pressure to and exhaust from both ends of cylinder 142ª are controlled by a hand valve 145 (Fig. 1) at the operator's station K.

Journaled in standards 146 connected to the back of the frame 139 of the machine is a grooved roller 147, (Figs. 15 and 16) which is continuously driven by a link belt 148 from a sprocket wheel on a short cross shaft 149. The shaft 149 is driven from a longitudinal shaft 150, which is driven by a motor 151 through suitable gearing in casing 152, (Figs. 6 and 7). The upper portion of grooved roller 147 is positioned to receive a rod from the straightener and feed it to a clapper box E (Figs. 23 and 24) having sides supported by standards 154, and provided with a drop bottom 155 supported on arms 156 connected to a shaft 157.

The clapper box is arranged to prevent whipping of the rod being straightened beyond the confines of the box, and after a rod has been straightened the bottom 155 is dropped to permit the rod to pass to the receiving rack F (Fig. 24).

Shaft 157 is rocked to drop the bottom 155 by means of a piston in a cylinder 158 through the medium of connections 159, clearly shown in Figs. 16 and 18, the air being admitted to the cylinder and exhausted therefrom by a hand valve 160 (Fig. 6) at the operator's station K.

In the operation of the straightener, the operator at station K, after feeding a rod from a trough 78, passes the rod through bell or guide 103 into engagement with rolls 104 and 115. When so positioned, valve 145 is actuated to admit fluid pressure to one end of cylinder 142ª and open the other end to exhaust to actuate toggles 141 to move roller 114 into engagement with the rod to be straightened. The point of engagement between the roller 114 and the rod being straightened is at some position intermediate the rolls 104 and the rolls 115 whereby the pressure exerted by the roller 114 for straightening purposes may act in known manner during rotation of the rod under the influence of the rolls 104 to remove any curvature therefrom. It will be understood that the rollers 114 may be set at any desired angle with respect to the axis of the rod being straightened and thereby determine its speed of advance during the straightening operation. By the time the rod has been straightened and leaves the zone of action of the straightening means, it will have come into engagement with roller 147 and will be advanced thereby. The adjusting screw 134 enables a micrometric adjustment of the position of the rollers 114 to be obtained whereby exactly the required pressure for straightening purposes is made available.
After the rod has passed the straightening rolls, valve 145 is again actuated to reverse the movement of the piston in cylinder 142ª, to raise roller 114, and immediately thereafter valve 160 is actuated to control the air supply to cylinder 158, to drop the bottom of the clapper box E and deposit the straightened rod onto receiving rack F.

The rolls 114 and 115 can be adjusted in various directions by the mechanisms above described, in order to adjust them for rods of different sizes and varying pressure on the rods, as well as to lengthen or shorten the distances between the several rolls.

The receiving rack F below the clapper box E has two reversely inclined ledges 161 (Fig. 24) extending from standards 154. Mounted on said standards above each lower ledge 161 is an adjustable guard 162 arranged to form the proper width grooves between the lower ledges and the guards for the particular rods therein, thereby preventing piling of the rods in the rack, and permitting them to be successively fed to a trough 163 formed by recesses in the standards.
The trough 163 is in line with one of the shears or crackers H (Figs. 8 and 9), and the straightened rods are delivered from the trough to the shears by grooved rollers 164, continuously rotated by shaft 150 which also drives rollers 147 before described. The feed rollers 164 are journaled in brackets 165 connected to standards 154. The feed roller 164 adjacent the straightening machine is driven from shaft 149 by a link belt 149ª and suitable sprocket wheels, while the other rollers 164 are driven from shafts 149' by link belts, the shafts 149' being driven from shaft 150 by bevel gearing.

The rods are fed from rack F to trough 163, by fingers 80' and 81' actuated in a manner heretofore described in connection with the rod feed mechanism for the straightener, but in this case, gears 84' for racks 82' and 83' are oscillated by a shaft 166, which is in turn actuated by a hand lever 167, at the shear operator's station M, see Figs. 8 and 9.

The shears H, shown in dotted lines in Fig. 9, are driven by a motor and are provided with the usual clutch for throwing the shearing mechanism into operation to make one cycle each time it is actuated.

Pivoted on the housing of the shears is a yoke 168 suitably counter-weighted and provided with an operating handle 169. The yoke is also provided with adjustable rod stops 170, in line with the travel of the rods between the shear blades, and the feed rollers 164; one stop being in the line of rods fed from one unit, while the other stop is in the line of feed of the other unit. Pins 171 on the yoke 168, are engaged by a projection on the shear ram as it descends to shear, to thereby elevate the back of the yoke and the stops 170.

The rod feeding, take off and gauging mechanism in back of the shears, comprises a high speed roller 172 (Figs. 8, 9 and 25) for each unit, immediately in back of the shears, driven in a continuous manner by motor 173 through shaft 174 by suitable chain belt gearing 175.

Roller 172 is carried by a swinging arm 176 counterweighted and adapted to raise the rod passing between the shear blades, slightly above the blades, but free to move downwardly with the rod when the upper shear blade engages the rod and moves it against the lower blade for shearing. Beyond roller 172, and in line therewith, is a plurality of rollers 177, each journaled on the upper end of a lever 178, pivoted at 179. The lower ends of these levers are connected to a rod 180 reciprocated for each movement of the shears.

Journaled in bearings in standards 181, are rock shafts 182, one for each unit, each having an adjustable rod stop 182' thereon, adapted to be moved into and out of the line of movement of the rods passing between the shear blades, and adapted to be set to cut rods to predetermined lengths.

A shaft 183 is journaled in standards 184 and is driven by a gear 185, rotated from shaft 174, by gears 186.

Connected to shaft 183 are cams 187 and 188 (Fig. 27) arranged to make one complete rotation for each movement of the shears. The shaft 183 may be connected to gear 185 by a trip clutch arranged to make one rotation each time it is tripped.

Journaled in the base of the shears is a rock shaft 189 having a foot treadle 190 (Fig. 9) and a trip lever 191, this mechanism being arranged to simultaneously trip the shear clutch as well as the trip clutch for connecting gear 185 to shaft 183, each time the foot treadle is operated.

A plunger 192 is mounted for reciprocation in a guide 193 on the end standard 181, and is connected by suitable linkage 194 to rod 180. The end of plunger 192 is provided with a roller 195 in engagement with cam 187 on shaft 183, the arrangement being such that rod 180 is reciprocated for each rotation of shaft 183, to raise and lower rollers 177 slightly above and below inclined upper surfaces 196 (Fig. 26) on standards 181, forming receiving racks J for the cut rods.

A rack bar 197 mounted for reciprocation in guides on the back of the standard 181 adjacent to the shears has teeth on each side thereof which engage pinions 198 on stop rods 182 (Figs. 27 and 28). The lower end of rack bar 197 is connected to one end of a lever 199, by a link 200. Lever 199 is pivoted to a bracket 201 connected to the standard.

A roller 202 on the other end of lever 199 is held in engagement with cam 188 by a spring actuated plunger 203.

The shear operator at station M positions the yoke 168 as shown in Figs. 8 and 9, rocks one or both hand levers 167 to feed rods to troughs 163 (Fig. 24), from which they are fed to the shears against stops 170. The operator then depresses the foot treadle which sets the shears in motion to cut off the short crop ends marred by the jaws of the pulling grippers. These crop ends fall from the shears into a chute $h$ (Figs. 9 and 25), and during the descent of the shear ram, the pins 71 on yoke 168 will be engaged to elevate stops 170, and as no rod length has been cut from the rod or rods delivered to the shears, the mechanism beyond the shears will perform no function during this cycle of the shears. As the downward movement of the shears has removed stops 170, immediately after the upper shear blade is raised sufficiently to clear the end of the rod being fed from trough 163, rollers 164 will advance the rod until the end engages the limit stop 182'. The operator again depresses foot lever 190 to actuate the shears as well as the take off mechanism and stop 182' beyond the shears. Shortly after the foot treadle is actuated, and trip lever 191 (Fig. 25) has caused cams 187 and 188 to rotate, rack bar 197 will be lowered by cam 188 and rock the shafts 182. This will move stops 182' out of the paths of the cut rods, and the high speed rollers 172 will shoot the rods beyond stops 182' over rollers 177, which are at this time elevated above ledges 196.

After the cut rod has been advanced by the high speed roller against a fixed stop $h'$, the roller 195 will pass onto the low portion of cam 187, and through the medium of the various connections will reciprocate rods 180 and thereby lower rollers 177 below ledges 196, and permit the rods to run down their respective racks against the pivoted stops 204. When the low spot of cam 187 passes roller 195, rollers 177 will again be raised to receive the new length of rod fed between the shear blades, and stops 182' will again be shifted into the paths of the rods by the shifting of rack bar 197 as the low spot of cam 188 passes under roller 202. As soon as the rods have again been moved against stops 182', the operator can again set the shears in motion.

It might here be stated that the stops 170 are only lowered to cut off the crop ends of the drawn rods, and are maintained in their elevated position when cutting rods to length after the crop end has been sheared.

The stops 204 (Fig. 26) are connected to rock shafts 205, to which are connected cranks 206. Each crank 206 is connected to a lever 207 by means of a link 208. The levers are each pivoted to a brace rod 209 (Fig. 25) connected to standards 181. The levers 207 are each provided with a locking rod 210 for retaining the stops 204 in rod holding position.

When it is desired to unload racks J, lock rods 210 are released and levers 207 are raised which, through the link connections, will rock shafts 205, lower stops 204, and permit the rods to roll onto a truck positioned to receive them. Thereafter, the stops are again raised and locked.

If it is desired to catch a drawn bar and prevent it from falling into the receiving rack B below the draw-bench, the L-shaped levers 211 (Fig. 13) connected to shafts 212, adjacent rack bars 41 are rocked to the position shown in dotted lines in Fig. 13.

Certain advantages of my invention result from the provision of a method and apparatus for the production of cut to length drawn rods in a continuous manner, from the rough rolled rods, to the straightened cut to length rods, without the handling of piles of rods between the time the rods are fed to the sizing dies to the time the finished and cut to length rods are delivered from the apparatus for shipment.

Another advantage results from the provision of an apparatus in which the straightening machine overlaps the draw-bench a distance slightly less than the length of the run of the rack bar of the drawing gripper, and thereby greatly reduces the required floor space for drawing and straightening rods.

A further advantage results from the provision of an apparatus of the character described comprising two complete units side by side and so arranged that three operators can readily attend to both units and thereby greatly reduce the cost of production.

Still another advantage results from the provision of an apparatus of this character in which the units are independent of one another so that if there is a breakdown of either unit, the other unit can be operated. Further advantages result from the provision of sufficient storage space for rods passing through each unit of the apparatus between the different operators' stations, to avoid the necessity of shutting down one or more portions of the apparatus, if another portion is shut down for a short period.

A still further advantage results from the provision of an apparatus such as above described, in which the line of movement of the rods through the dies of the draw bench is elevated to a considerable extent above the line of movement of the rods through the straightener, thereby permitting the positioning of the straightening machine adjacent the ends of the drawn rods on the rack to which the rods are delivered from the drawbench, without cutting off access to the operator's station at the straightener.

An additional advantage results from the provision of an apparatus in which the line of movement of the rods in the different steps of working is successively lower, which permits the feeding of the rods by gravity from the racks to the rod runways for delivery to the apparatus for the next working step and thereby obviates the necessity of lifting a rod either manually or by power means from the time the rolled rods are positioned on the rack in front of the draw-bench to the time the cut to length rods are delivered to trucks for removal or shipment or storage. This positioning of the rod runways or feed troughs in successively lower planes not only avoids the necessity of manually lifting a work piece at any time during working of the rods, but also avoids the necessity of providing power actuated mechanism for elevating a rod during the entire working of the rods.

A still further advantage results from the provision of pneumatic control means adjacent to the operator's station, and preferably intermediate adjacent units, whereby the portions of the apparatus which the operator controls are quickly and readily controlled from his station.

A further advantage results from the provision of power actuated means for closing the jaws of the pushing gripper onto the rod to be drawn and for automatically releasing and opening said jaws when the rod has been pushed through the die into gripping position between the jaws of the pulling gripper, and from the provision of rocking jaws for the pushing gripper enabling two rods to be gripped with equal pressure even though of slightly different diameters.

A further advantage results from the provision of fluid actuated clutches for the draw-bench with control means adjacent the operator's station, whereby he can readily start, stop and reverse the movement of the grippers, as well as the provision of means for automatically reversing the movement of the drawing gripper after it has moved a predetermined distance in either direction.

Another advantage results from the provision of adjustable receiving and storing racks between the different rod working elements of the apparatus whereby the rods are positioned for successive delivery to the next operating stage, as well as from the means under the control of operator for successively delivering rods from the receiving rack for the preceding working element to the working element under his control.

Still other desirable results are obtained from the provision of straightening elements adapted to give a finely adjusted pressure condition operable between supporting points adjustable toward and from each other, together with the manner of controlling the amount of pressure and the manner of effecting operation of the pressure producing means.

Still further advantages result from the provision of a machine of the general character herein contemplated embodying a plurality of operating units in end to end relationship with controlling means of such nature that an operator at a station between two adjacent working elements or machines may simultaneously or successively deposit a rod or rods in each of two rod runs, together with means for independently controlling at will the feed of either or both of said rods in an axial direction for a succeeding operation.

Other advantages result from the means for gauging the lengths, for facilitating a gripping operation, for effecting automatic removal of stops by means of which gauging is accomplished, from the provision of controls whereby rods may be stored or progressively operated upon, and from the provision of storage means adapted to retain a series of drawn, straightened and cut to length rods in a position in which they may be delivered by gravity to receiving truck or other carrier for transportation to the desired point.

I claim:

1. The method of producing metal rods in a continuous manner, comprising drawing the rods to size, delivering the drawn rods to a receiver and maintaining them therein in a prearranged order, successively withdrawing the rods from the receiver and successively straightening them in said order, during the withdrawing.

2. The method of producing metal rods in a continuous manner, comprising drawing the rods to size, gravitating the drawn rods to a receiver and maintaining them therein in a prearranged order, successively withdrawing the rods from the receiver and successively straightening them in said order, during the withdrawing, and substantially in the plane in which they are withdrawn.

3. The method of producing metal rods in a continuous manner, comprising drawing the rods to size, delivering the drawn rods to a receiver and maintaining them therein in a prearranged order, successively gravitating the rods one by one to a lower plane, withdrawing the rods in the last mentioned plane and straightening them during the withdrawal.

4. The method of producing metal rods in a continuous manner, comprising drawing the rods to size, gravitating the drawn rods to a receiver and maintaining them therein in a prearranged order, successively gravitating the rods one by one to a lower plane, withdrawing the rods in the last mentioned plane and straightening them during the withdrawal.

5. The method of producing metal rods in a continuous manner, comprising drawing the rods to size, delivering the drawn rods to a receiver and maintaining them therein in a prearranged order, successively withdrawing the rods from the receiver and successively straightening them in said order, during the withdrawing, delivering the straightened rods to a second receiver and maintaining them in a prearranged order therein, successively withdrawing the rods from the second receiver, and cutting them into shorter lengths.

6. The method of producing cut to length drawn metal rods in a continuous manner, comprising drawing the rods to size, dropping the drawn rods into a receiver and maintaining the rods in a prearranged order in the receiver, successively dropping the rods to a lower plane, withdrawing the rods in the last mentioned plane and straightening them as they are withdrawn, dropping the straightened rods into a second receiver and maintaining the rods in a prearranged order in the second receiver, successively dropping the straightened rods to a lower plane, withdrawing the rods in the last mentioned plane, and cutting to length as withdrawn.

7. The method of producing cut to length drawn metal rods in a continuous manner, comprising drawing the rods to size, dropping the drawn rods into a receiver and maintaining the rods in a prearranged order in the receiver, successively dropping the rdos to a lower plane, withdrawing the rods in the last mentioned plane and straightening them as they are withdrawn, dropping the straightened rods into a second receiver and maintaining the rods in a prearranged order in the second receiver, successively dropping the straightened rods to a lower plane, withdrawing the rods in the last mentioned plane and cutting to length as withdrawn, and then piling the cut lengths by gravity.

8. A metal working machine having a die, means for drawing rods through the die, means for receiving and maintaining the drawn rods in a prearranged order, a rod straightener, and means for withdrawing the rods from the receiving means in said order and delivering them to the straightener.

9. A metal working machine having a die, means for drawing rods through the die, means below the drawing means for receiving and maintaining the drawn rods in a prearranged order, a rod straightener, and means for withdrawing the rods from the receiving means in said order and delivering them to the straightener.

10. A metal working machine having a die, means for drawing rods through the die, means below the drawing means for receiving and maintaining the drawn rods in a prearranged order, a rod straightener, means for withdrawing the rods from the receiving means in said order and delivering them to the straightener, and means for receiving the straightened rods and maintaining them in a prearranged order, a shearing device, means for withdrawing the rods from the last mentioned receiving means and feeding them to the shears.

11. A metal working machine having a die, means for drawing rods through the die, means below the drawing means for receiving and maintaining the drawn rods in a prearranged order, a rod straightener, means for withdrawing the rods from the receiving means in said order and delivering them to the straightener, means for receiving the straightened rods and maintaining them in a prearranged order, a shearing device, means for withdrawing the rods from the last mentioned receiving means and feeding them to the shears, means for actuating the shears, and means for withdrawing the cut rod length from the shears after shearing.

12. A metal working machine having a die, means for drawing rods through the die, means below the drawing means for receiving and maintaining the drawn rods in a prearranged order, a rod straightener, means for withdrawing the rods from the receiving means in said order and delivering them to the straightener, means for receiving the straightened rods and maintaining them in a prearranged order, a shearing device, means for withdrawing the rods from the last mentioned receiving means and feeding them to the shears, means for actuating the shears, an automatic limit stop, means controlled by the movement of the shears for moving said stop into and out of operation, and means for withdrawing the cut rod length from the shears after shearing.

13. A metal working machine comprising a draw-bench, an inclined receiver below the draw-bench, means on the receiver for maintaining the rods in a prearranged order, a rod runway below the receiver, means for permitting the rods to successively drop from the receiver to the runway, a straightener having rod straightening means in the plane of the runway, and means for delivering the rods from the runway to the straightener.

14. A metal working machine comprising a draw-bench, an inclined receiver below the draw-bench, means on the receiver for maintaining the rods in a prearranged order, a rod runway below the receiver, means for permitting the rods to successively drop from the receiver to the runway, a straightener having rod straightening means in the plane of the runway, means for delivering the rods from the runway to the straightener, means in the plane of the straightening means for withdrawing the rods, means for holding the leading end of the rods in substantially the plane of the straightening means until the other ends of the rods have cleared the straightening means, a receiver below the holding means, and means for releasing the rods from the holding means and permitting them to drop onto the receiver.

15. A metal working machine comprising a draw-bench, an inclined receiver below the draw-bench, means on the receiver for maintaining the rods in a prearranged order, a rod runway below the receiver, means for permitting the rods to successively drop from the receiver to the runway, a straightener having rod straightening means in the plane of the runway, means for delivering the rods from the runway to the straightener, means in the plane of the straightening means for withdrawing the rods, means for holding the leading end of the rods in substantially the plane of the straightening means, an inclined receiver below the holding means, means for releasing the rods from the holding means and permitting them to drop onto the receiver, means on the second receiver for retaining the rods in a prearranged order, a runway in a plane below said receiver, means for permitting the rods to drop one by one to the runway, shears for cutting the rods into short lengths, means for feeding the rods from the runway to the shears, and means for actuating the shears.

16. A metal working machine comprising a draw-bench, an inclined receiver below the draw-bench, means on the receiver for maintaining the rods in a prearranged order, a rod runway below the receiver, means for permitting the rods to successively drop from the receiver to the runway, a straightener having rod straightening means in the plane of the runway, means for delivering the rods from the runway to the straightener, means in the plane of the straightening means for withdrawing the rods, means for holding the leading end of the rods in substantially the plane of the straightening means, an inclined receiver below the holding means, means for releasing the rods from the holding means and permitting them to drop onto the receiver, means on the second receiver for retaining the rods in a prearranged order, a runway in a plane below said receiver, means for permitting the rods to drop one by one to the runway, shears for cutting the rods into short lengths, means for feeding the rods from the runway to the shears, means for actuating the shears, and means for withdrawing the cut lengths of rods from the shears.

17. A metal working machine comprising a draw-bench, an inclined receiver below the draw-bench, means on the receiver for maintaining the rods in a prearranged order, a rod runway below the receiver, means for permitting the rods to successively drop from the receiver to the runway, a straightener having rod straightening means in the plane of the runway, means for delivering the rods from the runway to the straightener, means in the plane of the straightening means for withdrawing the rods, means for holding the leading end of the rods in substantially the plane of the straightening means, an inclined receiver below the holding means, means for releasing the rods from the holding means and permitting them to drop onto the receiver, means on the second receiver for retaining the rods in a prearranged order, a runway in a plane below said receiver, means for permitting the rods to drop one by one to the runway, shears for cutting the rods into short lengths, means for feeding the rods from the runway to the shears, means for actuating the shears, a rod stop beyond the shears, means for moving the stop into and out of the line of movement of the fed rod, and means controlled by the movement of the shears for setting the stop moving means into motion.

18. A metal working machine comprising a draw-bench, an inclined receiver below the draw-bench, means on the receiver for maintaining the rods in a prearranged order, a rod runway below the receiver, means for permitting the rods to successively drop from the receiver to the runway, a straightener having rod straightening means in the plane of the runway, means for delivering the rods from the runway to the straightener, means in the plane of the straightening means for withdrawing the rods, means for holding the leading end of the rods in substantially the plane of the straightening means, an inclined receiver below the holding means, means for releasing the rods from the holding means and permitting them to drop onto the receiver, means on the second receiver for retaining the rods in a prearranged order, a runway in a plane below said receiver, means for permitting the rods to drop one by one to the runway, shears for cutting the rods into short lengths, means for feeding the rods from the runway to the shears, means for actuating the shears, a rod stop beyond the shears, means for moving the stop into and out of the line of movement of the fed rod, means controlled by the movement of the shears for setting the stop moving means into motion, and an inclined rod receiver cooperating with the cut lengths rod withdrawing means.

19. The combination of a draw-bench for drawing rods through a die, a rod straightener and a shear for cutting the straightened rods into shorter lengths, through which the rods are passed successively in successively lower planes, a rod receiver in a plane between the planes of the paths of the rod through the draw-bench and the straightener, and a second rod receiver in a plane between the planes of the paths of the rod through the straightener and shears.

20. The combination of a draw-bench for drawing rods through a die, a rod straightener and a shear for cutting the straightened rods into shorter lengths, through which the rods are passed successively in successively lower planes, a rod receiver in a plane between the planes of the paths of the rod through the draw-bench and the straightener, a second rod receiver in a plane between the planes of the paths of the rod through the straightener and shears, means for feeding a rod from the first receiver to the straightener, and other means for feeding a rod from the second receiver to the shears.

21. A metal working machine having two separate units side by side, each unit comprising a draw-bench having means for drawing rods through a die, a rod receiver below the line of draw of the rods, a rod straightener, means for actuating the straightener, means for delivering rods to the straightener from said receiver, the path of travel of the rods through the straightener being in the plane of said receiver, a second receiver beyond the straightener and in a plane below the path of travel of the rods through the straightener, shearing means beyond the second receiver, means for actuating the shears, means for delivering rods from a receiver to a straightener, an operator's station adjacent the dies of the draw-benches, a second operator's station between the first receivers and the straighteners, and a third operator's station between the second receivers and the shearing means.

22. A metal working machine having two separate units side by side, each unit comprising a draw-bench having means for drawing rods through a die, a rod receiver below the line of draw of the rods, a rod straightener, means for actuating the straightener, means for delivering rods to the straightener, from said receiver, the path of travel of the rods through the straightener being in the plane of said receiver, a second receiver beyond the straightener and in a plane below the path of travel of the rods through the straightener, shearing means beyond the second receiver, means for actuating the shears, means for delivering rods from a receiver to a straightener, an operator's station adjacent the dies of the draw-benches, control means at said station for controlling the drawing means of both benches, a second operator's station between the first receivers and the straighteners, control means at the second station for controlling the straightener actuating means and the means for delivering rods to the straightener, a third operator's station between the second receivers and the shearing means, and control means at the third station for controlling the shear actuating mechanism and for controlling the means for delivering rods to the shears.

23. A metal working machine having a draw-bench including a die, a rack bar, a drawhead connected to the rack bar, means for reciprocating the rack bar, a receiver below the draw-bench for receiving the drawn rods, a rod straightener beyond the receiver, and a rack bar support extending a relatively long distance beyond the straightener.

24. In a machine of the character described, a drawing unit, a straightening unit, and a shearing unit located in end to end relationship and in successively lower planes.

25. In a machine of the character described, a drawing unit, a straightening unit, and a shearing unit located in end to end relationship and in successively lower planes, there being gravity operated transfer means for effecting feed from the plane of one unit to the plane of the next unit.

26. In a machine of the character described, a drawing unit and a straightening unit, the line of draw of said drawing unit being laterally offset with respect to the line of straightening of said straightening unit, and guiding means for the drawing unit overlapping the straightening unit.

27. In a machine of the character described, a drawing unit and a straightening unit, the line of draw of said drawing unit being laterally offset with respect to the line of straightening of said straightening unit, and guiding means for the drawing unit overlapping the straightening unit, said units being effective in different horizontal planes.

28. In a machine of the character described, a plurality of units in end to end relationship and effective for performing successive operations on a rod, and gravity operating means for storing and feeding the rods intermediate adjacent units.

29. In a machine of the character described, means for drawing a rod, means for straightening a drawn rod, means for shearing a straightened rod, means for feeding a rod successively to said means, and means for accelerating movement of a rod after shearing.

30. In a machine of the character decribed, a plurality of units for performing progressive operations on an article, said units being arranged in end to end relationship and in progressively lower planes, and means intermediate successive units for controlling the operations of units on either side thereof.

31. In a machine of the character described, means for drawing a plurality of articles in laterally spaced planes, means for causing the drawn articles to move endwardly toward each other, receiving means for the drawn articles between the planes of drawing thereof, and straightening means in line with said receiving means.

32. In a machine of the character described, a drawing unit, a shearing unit, and a straightening unit intermediate said drawing and shearing units, said straightening unit comprising a pair of rollers and self centering means for supporting said rollers.

33. In a machine of the character described, a drawing unit and a straightening unit adapted for substantially continuous operation, said straightening unit including a self-centering yoke for the material fed thereto from the drawing unit, and rollers carried by said yoke.

34. A metal working machine, having a draw-bench including a die, a rack bar, a draw-head connected to the rack bar, means for reciprocating the rack bar, adjustable means for reversing the movement of the rack bar at predetermined limits of its movement in either direction, a receiver for receiving the drawn rods, and mechanism for receiving the rods from said receiver and further operating thereon.

35. A metal working machine, having a draw-bench including a die, a rack bar, a draw-head connected to the rack bar, means for reciprocating the rack bar, fluid actuated means for reversing the movement of the rack bar, adjustable means actuated by the movement of the rack bar for controlling said fluid actuated means, a receiver for receiving drawn rods from the draw-bench, and means cooperating with said receiver to receive rods therefrom and perform a further operation thereon.

36. A metal working machine, having a draw-bench including a die, a rack bar, a draw-head connected to the rack bar, jaws on the draw-head, a pushing gripper, jaws on the pushing gripper for engaging a rod and pushing it through said die, means for closing the jaws on the pushing gripper, means for connecting the pushing gripper to the draw-head, means for releasing the pushing gripper from the draw-head after it has moved with the draw-head a predetermined distance, means for opening the jaws of the pushing gripper before it is released from the draw-head, and means for receiving drawn material from said draw-bench and performing a further operation thereon.

37. In a machine of the character described, a drawing unit, including a rack bar, adjustable means for reversing the movement of the rack bar, and a straightening unit for receiving drawn material from said drawing unit.

38. In a machine of the character described, a drawing unit including compensating gripping means for the material to be drawn, and a straightening unit cooperating therewith for receiving drawn material from said compensating gripping means.

39. A metal working machine, having a draw-bench including a die, a rack bar, a draw-head connected to the rack bar, means for reciprocating the rack bar, adjustable means for reversing the movement of the rack bar at predetermined limits of its movement in either direction, a receiver for receiving the drawn rods, and mechanism for receiving the rods from said receiver and further operating thereon, said receiver comprising an inclined rack having a groove for the drawn material.

In testimony whereof I have hereunto set my hand.

JAMES T. MOLTRUP.